US011968366B2

(12) United States Patent
Zhang et al.

(10) Patent No.: US 11,968,366 B2
(45) Date of Patent: Apr. 23, 2024

(54) VIDEO ENCODING METHOD AND APPARATUS, VIDEO DECODING METHOD AND APPARATUS, DEVICE, AND STORAGE MEDIUM

(71) Applicant: TENCENT TECHNOLOGY (SHENZHEN) COMPANY LIMITED, Guangdong (CN)

(72) Inventors: Hongbin Zhang, Guangdong (CN); Xiang Li, Guangdong (CN); Guichun Li, Guangdong (CN); Shan Liu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 328 days.

(21) Appl. No.: 17/452,715

(22) Filed: Oct. 28, 2021

(65) Prior Publication Data

US 2022/0053191 A1 Feb. 17, 2022

Related U.S. Application Data

(63) Continuation of application No. PCT/CN2020/134608, filed on Dec. 8, 2020.

(30) Foreign Application Priority Data

Dec. 31, 2019 (CN) .......................... 201911424021.5

(51) Int. Cl.
*H04N 19/70* (2014.01)
*H04N 19/105* (2014.01)
(Continued)

(52) U.S. Cl.
CPC ......... *H04N 19/126* (2014.11); *H04N 19/105* (2014.11); *H04N 19/176* (2014.11); *H04N 19/186* (2014.11); *H04N 19/70* (2014.11)

(58) Field of Classification Search
CPC ..... H04N 19/126; H04N 19/186; H04N 19/70
(Continued)

(56) References Cited

U.S. PATENT DOCUMENTS 9,135,681 B2 9/2015 Tomaselli et al.
9,762,902 B2 9/2017 Zheng et al.
(Continued)

FOREIGN PATENT DOCUMENTS

CN 103716623 A 4/2014
CN 105519108 A 4/2016
(Continued)

OTHER PUBLICATIONS

De Lagrange et al. "Non-CE7: Quantization matrices with single identifier and prediction from larger ones" Joint Video Experts Team (JVET) of ITU-T SG 16 WP 3 and ISO/IEC ITC 1/SC 29/WG 11 15th Meeting: Gothenburg, SE, Jul. 3-12, 2019, Document: JVET-O0223.
(Continued)

*Primary Examiner* — Jeffery A Williams
(74) *Attorney, Agent, or Firm* — ARENTFOX SCHIFF LLP

(57) ABSTRACT

A video encoding method and apparatus is provided. The method includes determining a chroma format of a video frame, determining, for a currently decoded first quantization matrix (QM), a size of the first QM according to the determined chroma format and a size of a luma transform block (TB) when the first QM is a chroma QM, and decoding the first QM when the size of the first QM is greater than zero. Thus, a size of a chroma QM is flexibly determined according to a chroma format and a size of a luma TB, rather than a fixed size predefined according to an identifier of the QM, thereby improving flexibility during encoding and decoding of the chroma QM. Apparatus and non-transitory
(Continued)

computer-readable storage medium counterpart embodiments are also provided.

19 Claims, 6 Drawing Sheets

(51) Int. Cl.
*H04N 19/126* (2014.01)
*H04N 19/176* (2014.01)
*H04N 19/186* (2014.01)

(58) Field of Classification Search
USPC .................................................... 375/240.02
See application file for complete search history.

(56) References Cited

U.S. PATENT DOCUMENTS

| | | | |
|---|---|---|---|
| 9,866,839 | B2 | 1/2018 | Lim et al. |
| 10,306,228 | B2 | 5/2019 | Lim et al. |
| 10,708,595 | B2 | 7/2020 | Lim et al. |
| 2013/0177075 | A1 | 7/2013 | Zheng et al. |
| 2015/0334396 | A1 | 11/2015 | Lim et al. |
| 2018/0048905 | A1 | 2/2018 | Lim et al. |
| 2019/0124366 | A1 | 4/2019 | Zhao et al. |
| 2019/0238850 | A1 | 8/2019 | Lim et al. |
| 2020/0296376 | A1 | 9/2020 | Lim et al. |

FOREIGN PATENT DOCUMENTS

| | | | | |
|---|---|---|---|---|
| CN | 109194967 | A | 1/2019 | |
| CN | 109196863 | A | 1/2019 | |
| CN | 111050171 | A | 4/2020 | |
| CN | 111147858 | A | 5/2020 | |
| EP | 2806640 | A1 * | 11/2014 | ............. H04N 19/00 |
| WO | WO-2020041003 | A1 * | 2/2020 | ........... H04N 19/124 |

OTHER PUBLICATIONS

De Lagrange et al "AHG15: Quantization matrices with single identifier and enhanced prediction" Joint Video Experts Team (JVET) of ITU-T SG 16 WP 3 and ISO/IEC ITC 1/SC 29/WG 11 16th Meeting: Geneva, CH, Oct. 1-11, 2019, Document: JVET-P0110-v2 11.10-v2.

Written Opinion dated Mar. 10, 2021 issued in corresponding application PCT/CN2020/134608.

International Search Report issued in corresponding application PCT/CN2020/134608 dated Mar. 10, 2021 (with English translation).

* cited by examiner

VIDEO ENCODING METHOD AND APPARATUS, VIDEO DECODING METHOD AND APPARATUS, DEVICE, AND STORAGE MEDIUM

RELATED APPLICATIONS

This application is a continuation application of International Application No. PCT/CN2020/134608, entitled "VIDEO ENCODING METHOD AND APPARATUS, VIDEO DECODING METHOD AND APPARATUS, DEVICE, AND STORAGE MEDIUM" and filed on Dec. 8, 2020, which claims priority to Chinese Patent Application No. 201911424021.5, entitled "VIDEO DECODING METHOD AND APPARATUS, DEVICE, AND STORAGE MEDIUM," filed on Dec. 31, 2019. The entire disclosures of the above-identified prior applications are incorporated herein by reference in their entirety.

FIELD OF THE TECHNOLOGY

Embodiments of this disclosure relate to the field of video encoding and decoding technologies, including a video encoding method and apparatus, a video decoding method and apparatus, a device, and a storage medium.

BACKGROUND OF THE DISCLOSURE

H.266 is a new generation of video encoding technology improved based on H.265/High Efficient Video Coding (HEVC), and has been officially named Versatile Video Coding (VVC). It is organized and guided by the Joint Video Experts Team (JVET) for constant updating and improvement.

Currently, quantization matrices (QMs) in the following two forms may be used in VVC: a default QM and a user-defined QM, to support frequency-dependent scaling. When a QM is enabled, transform coefficients in a transform block (TB) may be individually quantized according to a quantization coefficient (that is, an integer weight value) included in the QM.

In current encoding and decoding methods of a quantization matrix used in VVC, the flexibly is not high, and the computational complexity of a decoder side is relatively high.

SUMMARY

Embodiments of this disclosure provide a video encoding method and apparatus, a video decoding method and apparatus, a device, and a storage medium, which can improve flexibly of QM encoding and decoding, and reduce computational complexity of a decoder side. The technical solutions are as follows.

According to an aspect, an embodiment of this disclosure provides a video decoding method, including: (1) determining a chroma format of a to-be-decoded video frame; (2) determining, for a currently decoded first QM, a size of the first QM according to the chroma format and a size of a luma TB, when the first QM is a chroma QM; and (3) decoding the first QM when the determined size of the first QM is greater than zero.

According to another aspect, an embodiment of this disclosure provides a video encoding method, including: (1) determining a chroma format of a video frame; (2) determining, for a currently encoded first QM, a size of the first QM according to the chroma format and a size of a luma TB, when the first QM is a chroma QM; and (3) encoding the first QM when the determined size of the first QM is greater than zero.

According to still another aspect, an embodiment of this disclosure provides a video decoding apparatus, including: processing circuitry configured to (1) determine a chroma format of a to-be-decoded video frame; (2) determine, for a currently decoded first QM, a size of the first QM according to the determined chroma format and a size of a luma TB, when the first QM is a chroma QM; and (3) decode the first QM when the determined size of the first QM is greater than zero.

According to still another aspect, an embodiment of this disclosure provides a video encoding apparatus, including: processing circuitry configured to (1) determine a chroma format of a to-be-encoded video frame; (2) determine, for a currently encoded first QM, a size of the first QM according to the determined chroma format and a size of a luma TB, when the first QM is a chroma QM; and (3) encode the first QM when the determined size of the first QM is greater than zero.

According to still yet another aspect, an embodiment of this disclosure provides a computer device, including processing circuitry and a memory, the memory storing at least one instruction, at least one program, a code set, or an instruction set, the at least one instruction, the at least one program, the code set, or the instruction set being loaded and executed by the processing circuitry to implement the foregoing video decoding method, or implement the foregoing video encoding method.

According to still yet another aspect, an embodiment of this disclosure provides a non-transit computer-readable storage medium, storing at least one instruction, at least one program, a code set, or an instruction set, the at least one instruction, the at least one program, the code set, or the instruction set being loaded and executed by processing circuitry to implement the foregoing video decoding method, or implement the foregoing video encoding method.

According to still yet another aspect, an embodiment of this disclosure provides a computer program product, the computer program product, when executed by processing circuitry, being configured to implement the foregoing video decoding method, or implement the foregoing video encoding method.

The technical solutions provided in the embodiments of this application may include the following beneficial effects.

By determining a chroma format of a to-be-decoded video frame; determining, when a currently decoded QM is a chroma QM, a size of the currently decoded QM according to the chroma format and a size of a luma TB; and decoding the currently decoded QM when it is determined that the size of the currently decoded QM is greater than zero, a size of a chroma QM is flexibly determined according to a chroma format and a size of a luma TB, rather than a fixed size predefined according to an identifier (id) of the QM, thereby improving flexibility during encoding and decoding of the chroma QM. In addition, according to a size of a currently decoded QM, whether the QM needs to be decoded can be determined, so as to selectively decode QMs, thereby helping reduce computational complexity of a decoder side.

DESCRIPTION OF EMBODIMENTS

To make objectives, technical solutions, and advantages of this disclosure clearer, the following further describes implementations of this disclosure in detail with reference to the accompanying drawings.

Figure 1:
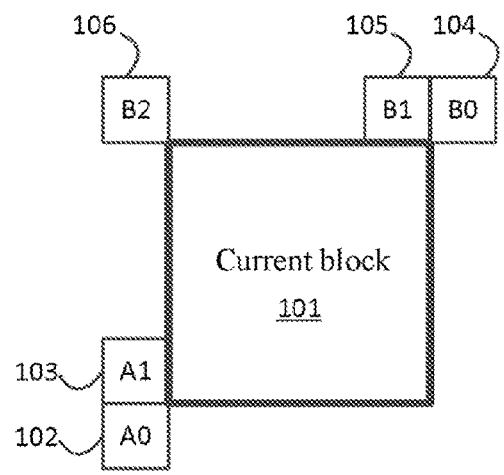
FIG. 1 is a schematic exemplary diagram of video encoding according to this disclosure.

Referring to FIG. 1, a current block 101 includes a sample having been found by an encoder during a motion search, and the sample can be predicted according to a previous block that has the same size and has generated a spatial offset. In addition, a motion vector (MV) can be exported from metadata associated with one or more reference pictures, rather than being directly encoded. For example, an MV associated with any one of five surrounding samples of A0, A1, B0, B1, and B2 (corresponding to 102 to 106 respectively) is used to export the MV from metadata of a nearest reference picture (according to a decoding sequence).

Figure 2:
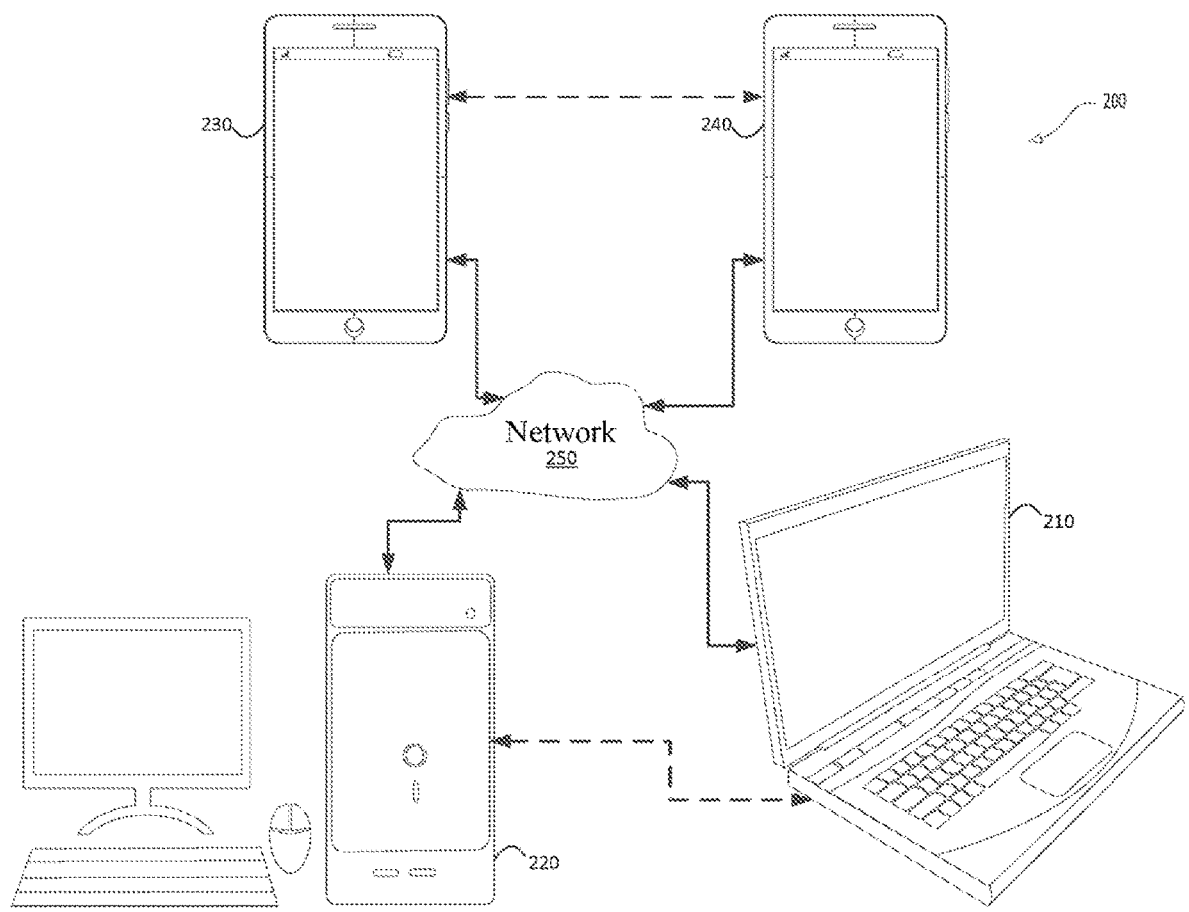
FIG. 2 is a simplified block diagram of a communication system according to an embodiment of this disclosure.

FIG. 2 is a simplified block diagram of a communication system according to an embodiment of this disclosure. The communication system 200 includes a plurality of devices. The devices may communicate with each other, for example, by using a network 250. For example, the communication system 200 includes a first device 210 and a second device 220 connected to each other by using the network 250. In an embodiment shown in FIG. 2, the first device 210 and the second device 220 perform one-way data transmission. For example, the first device 210 may encode video data, for example, a video picture captured by the first device 210, to transmit the video data to the second device 220 by using the network 250. Encoded video data is transmitted in a form of one or more encoded video bitstream. The second device 220 may receive the encoded video data from the network 250, decode the encoded video data to restore the video data, and display the video picture according to the restored video data. The one-way data transmission is relatively common in applications such as a media service application.

In another embodiment, the communication system 200 includes a third device 230 and a fourth device 240 that perform two-way transmission of encoded video data. The two-way transmission may occur, for example, during a video conference. For two-way data transmission, each of the third device 230 and the fourth device 240 may encode video data (for example, a video picture stream captured by the device), to transmit the encoded video data to the other of the third device 230 and the fourth device 240 by using the network 250. Each of the third device 230 and the fourth device 240 may further receive the encoded video data transmitted by the other of the third device 230 and the fourth device 240, may decode the encoded video data to restore the video data, and may display the video picture on an accessible display apparatus according to the restored video data.

In the embodiment of FIG. 2, the first device 210, the second device 220, the third device 230, and the fourth device 240 may be computer devices such as servers, personal computers (PCs), and smartphones. However, the principle disclosed in this disclosure is not limited herein. The embodiments of this disclosure are applicable to a PC, a mobile phone, a tablet computer, a media player and/or dedicated video conference device. The network 250 represents any quantity of networks that transmit encoded video data among the first device 210, the second device 220, the third device 230, and the fourth device 240, and include, for example, a wired and/or wireless communication network. The communication network 250 may exchange data in a circuit-switched and/or packet-switched channel. The network may include a telecommunication network, a local area network, a wide area network, and/or the Internet. For the purpose of this disclosure, unless explained below, the architecture and topology of the network 250 may be insignificant to the operations disclosed in this disclosure.

Figure 3:
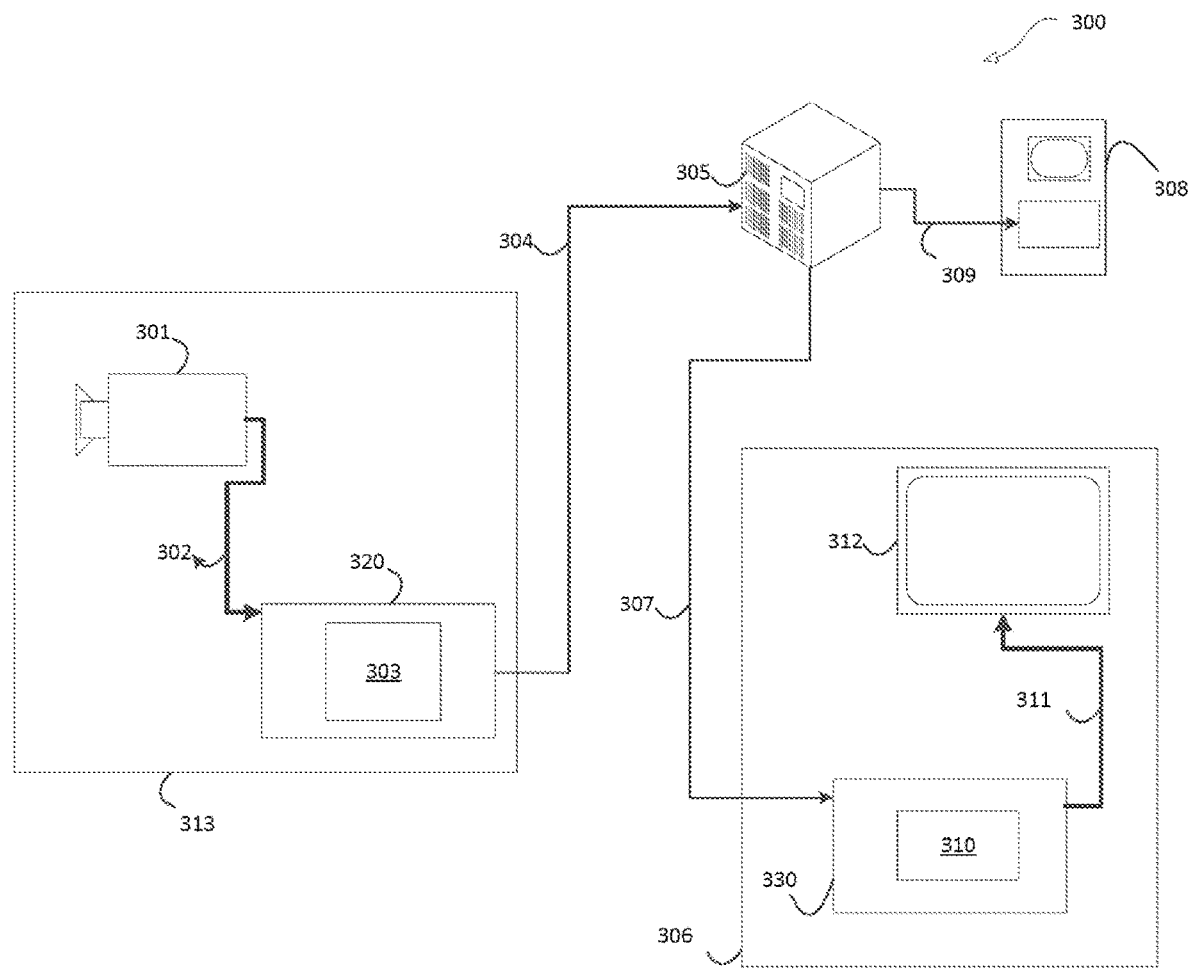
FIG. 3 is a schematic exemplary diagram of placement manners of a video encoder and a video decoder in a streaming transmission environment according to this disclosure.

In an embodiment, FIG. 3 shows placement manners of a video encoder and a video decoder in a streaming transmission environment. The subject disclosed in this disclosure may be equally applicable to other video-supporting applications such as a video conference application and a digital TV (television), to store and compress a video and the like on a digital media a compact disc (CD), a digital versatile disc (DVD), a memory stick, and the like.

A streaming transmission system may include an acquisition subsystem 313. The acquisition subsystem may include a video source 301 such as a digital camera. The video source creates an uncompressed video picture stream 302. In an embodiment, the video picture stream 302 includes a sample captured by a digital camera. Compared with encoded video data 304 (or an encoded video bitstream), the video picture stream 302 is described in a thick line to emphasize a video picture stream with a large data volume. The video picture stream 302 may be processed by an electronic device 320. The electronic device 320 includes a video encoder 303 coupled to the video source 301. The video encoder 303 may include hardware (processing circuitry), software, or a combination of hardware and software to implement or perform the aspects of the disclosed subject as described in more detail below. Compared with the video picture stream 302, the encoded video data 304 (or an encoded video bitstream 304) is described in a thin line to emphasize encoded video data 304 (or the encoded video bitstream 304) with a relatively small data volume, which may be stored on a steaming transmission server 305 for future use. One or more streaming transmission client subsystems, such as client subsystem 306 and client subsystem 308 in FIG. 3, may access a streaming transmission server 305 to retrieve a copy 307 and a copy 309 of the encoded video data 304. The client subsystem 306 may include, for example, a video decoder 310 in an electronic device 330. The video decoder 310 decodes the incoming copy 307 of the encoded video data and produces an output video picture stream 311 that can be presented on a display 312 (for example, a display screen) or another presentation apparatus (not depicted). In some streaming transmission systems, the encoded video data 304, the video data 307, and the video data 309 (for example, a video bitstream) may be encoded according to some video encoding/compression standards.

The electronic device 320 and the electronic device 330 may include other components (not shown). For example, the electronic device 320 may include a video decoder (not shown), and the electronic device 330 may further include a video encoder (not shown). The video decoder is configured to decode received encoded video data, and the video encoder is configured to encode video data.

Figure 4:
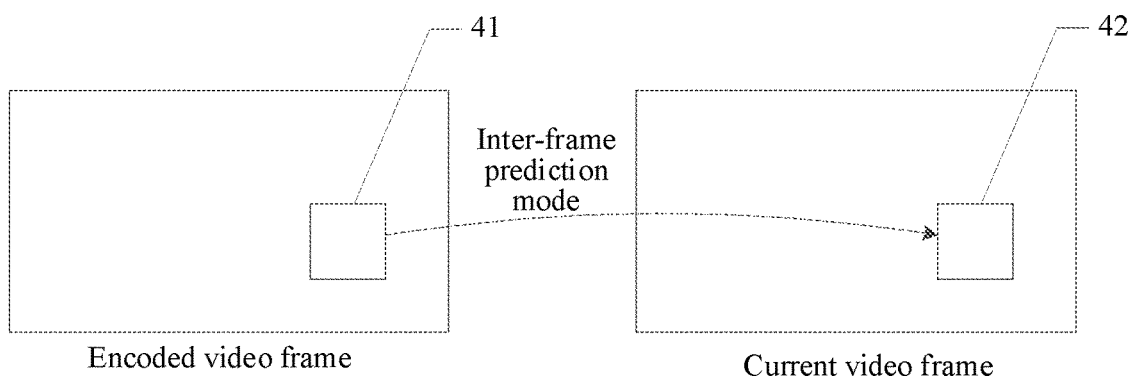
FIG. 4 is a schematic diagram of encoding in an inter-frame prediction mode according to an embodiment of this disclosure.
Figure 5:
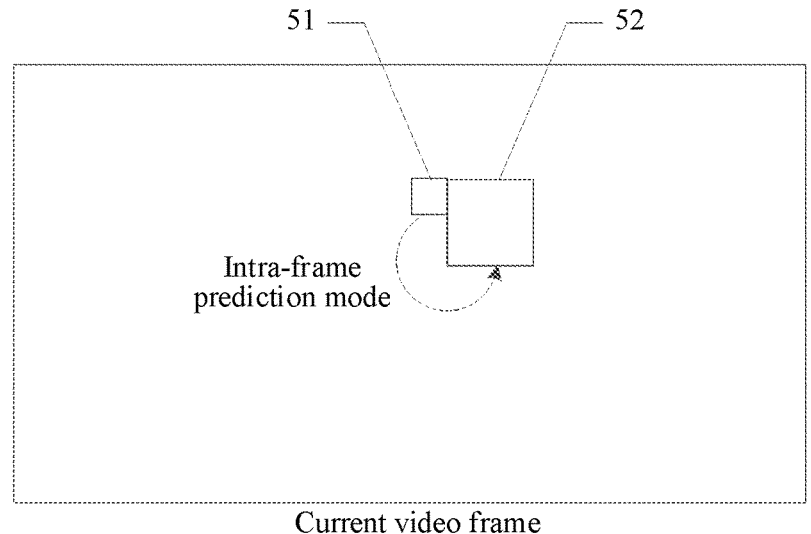
FIG. 5 is a schematic diagram of encoding in an intra-frame prediction mode according to an embodiment of this disclosure.

When an image block in a video frame is encoded, an inter-frame prediction mode or intra-frame prediction mode may be used, to generate a prediction block based on one or more encoded reference blocks. The prediction block may be an estimated version of an original block. A residual block may be generated by subtracting the original block from the prediction block, and vice versa. The residual block may be used for representing a predicted residual (or referred to as a predicted error). Because a data volume for representing the predicted residual may be usually less than a data volume for representing the original block, the residual block may be encoded to achieve a relatively high compress ratio. For example, as shown in FIG. 4, for the inter-frame prediction mode, an encoded reference block 41 and a to-be-encoded block 42 are located in two different video frames. As shown in FIG. 5, for the intra-frame prediction mode, an encoded reference block 51 and a to-be-encoded block 52 are located in the same video frame.

Subsequently, a residual value of a residual block in a spatial domain may be converted into a transform coefficient in a frequency domain. The conversion may be implemented through a two-dimensional transform such as a discrete cosine transform (DCT). In a transformation matrix, a low-index transform coefficient (for example, located in an upper left region) may correspond to a large spatial feature and has a relatively large magnitude; and a high-index transform coefficient (for example, located in a lower right region) may correspond to small spatial feature and has a relatively small magnitude. Further, a QM including a quantization coefficient may be applied to a transformation matrix, to quantize all transform coefficients into quantized transform coefficients. A result of quantization is that a scale or a magnitude of transform coefficients may be reduced. Some high-index transform coefficients may be reduced to zero, and then may be skipped in subsequent scanning and encoding steps.

Figure 6:
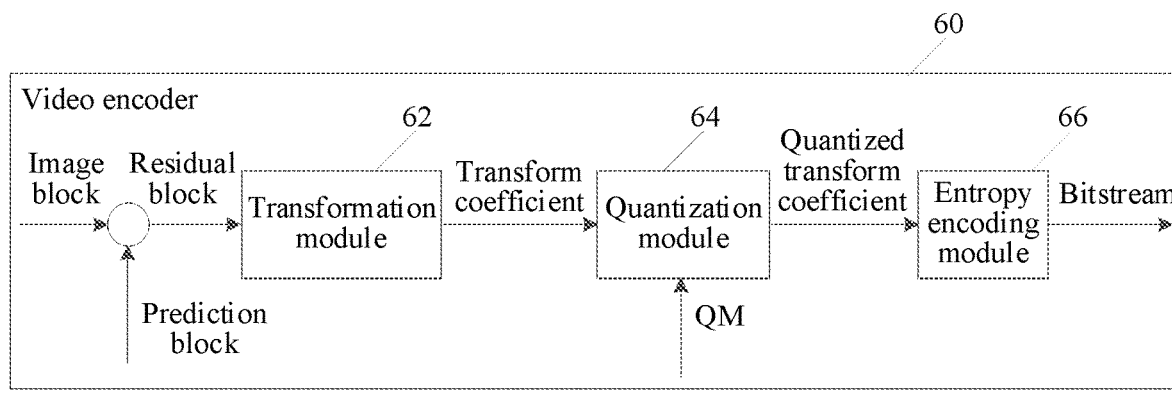
FIG. 6 is a schematic diagram of functional modules of a video encoder according to an embodiment of this disclosure.

FIG. 6 shows a part of an exemplary video encoder 60 including a transformation module 62, a quantization module 64, and an entropy encoding module 66. Although not shown in FIG. 6, it is to be understood that the video encoder 60 may alternatively include other modules such as a prediction module, a dequantization module, and a reconstruction module. During an operation, the video encoder 60 may obtain a video frame. The video frame may include a plurality of image blocks. For ease of brevity, encoding of one image block may be regarded as an example herein. To encode an image block, a prediction block may be first generated as an estimate of the image block. With reference to the above, the prediction block may be generated by the prediction module in an inter-frame prediction mode or an intra-frame prediction mode. Subsequently, a difference between the image block and the prediction block may be calculated to generate a residual block. The residual block may be transformed into a transform coefficient by the transformation module 62. During the transformation, a residual value in a spatial domain includes a large feature and a small feature, and is converted into a transform coefficient in a frequency domain. The frequency domain includes a high frequency band and a low frequency band. Subsequently the quantization module 64 may use a QM to quantize the transform coefficient, to generate a quantized transform coefficient. Further, the quantized transform coefficient may be encoded by the entropy encoding module 66, and is finally transmitted from the video encoder 60 as a part of a bitstream.

Figure 7:
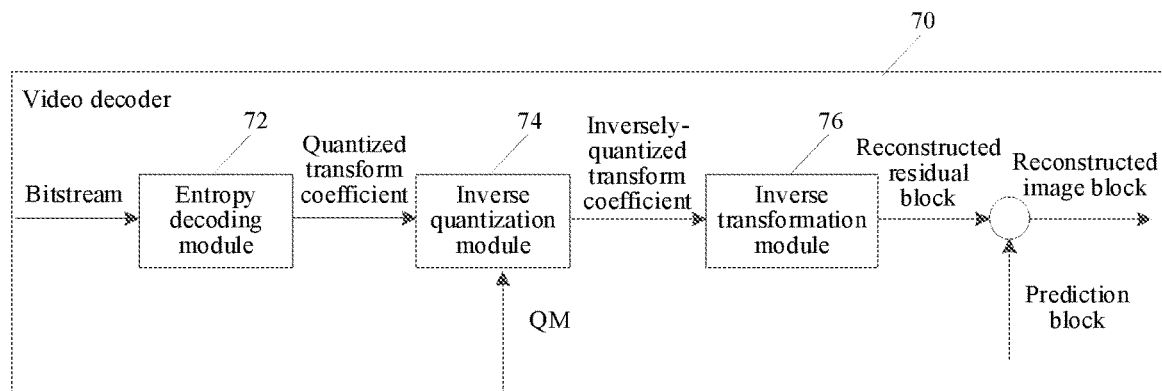
FIG. 7 is a schematic diagram of functional modules of a video decoder according to an embodiment of this disclosure.

FIG. 7 shows a part of an exemplary video decoder 70 including an entropy decoding module 72, an inverse quantization module 74, and an inverse transformation module 76. Although not shown in FIG. 7, it is to be understood that the video decoder 70 may alternatively include other modules such as a prediction module, a transformation module, and a quantization module. During an operation, the video decoder 70 may receive a bitstream outputted from the video encoder 60, and decode the bitstream in an inter-frame prediction mode or an intra-frame prediction mode, and output a reconstructed video frame. The entropy decoding module 72 may generate a quantized transform coefficient by performing entropy decoding on an inputted bitstream. The inverse quantization module 74 may inversely quantize the quantized transform coefficient based on a QM, to obtain an inversely-quantized transform coefficient. The inverse transformation module 76 inversely transforms the inversely-quantized transform coefficient, to generate a reconstructed residual block. Subsequently, a reconstructed image block is generated according to the reconstructed residual block and the prediction block.

It can be seen from the above that the QM is an essential part during video encoding and decoding. How much information of the transform coefficient is retained or filtered out may be determined by configuration of the QM, so that the QM may affect the encoding performance and encoding quality. Actually, QMs are used in both an encoder and a decoder. Specifically, to correctly decode an image, information about a quantization coefficient in a QM needs to be encoded in the encoder, and the information is transmitted from the encoder to the decoder. In a video encoding and decoding technology and standard, a QM may be sometimes referred to as a scaling matrix or a weight matrix. Therefore, the term "QM" used in this specification may be a general term covering a quantization matrix, a scaling matrix, a weight matrix, and other equivalent terms.

The following describes some basic concepts involved in the embodiments of this disclosure.

1. Quantization Matrix

In a latest version of a VVC test model (VTM) (that is, VTM7), not only square TBs but also non-square TBs are allowed, so that there is a relatively large quantity of QMs. To reduce a quantity of bits and memory requirements of QM signaling, an up-sampling and copying design is adopted for non-square TBs and large square TBs in VVC.

Figure 8:
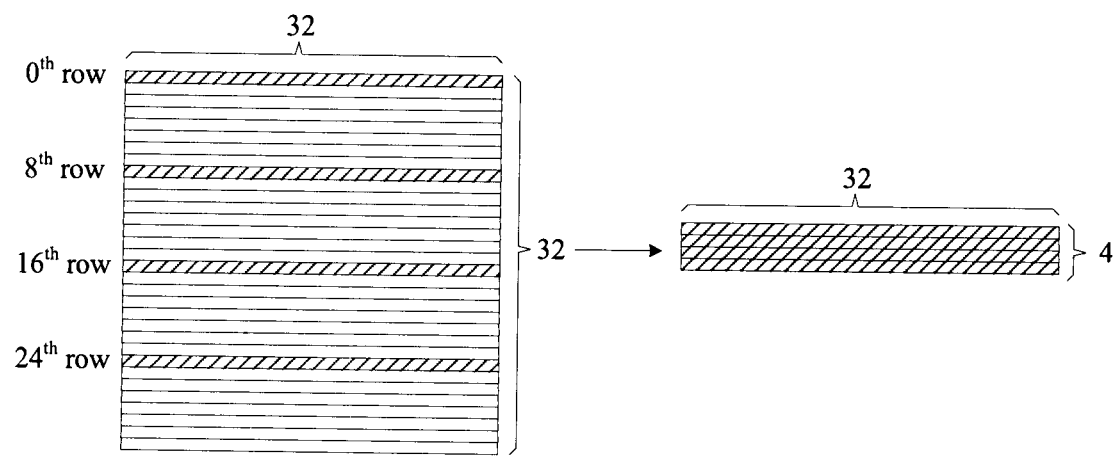
FIG. 8 is a schematic diagram of generating a QM through downsampling and copying according to an embodiment of this disclosure.

The non-square TBs do not exist in a VVC bitstream, and are obtained by copying corresponding square QMs on a decoder side. More specifically, a 32×4 QM is obtained by copying a $0^{th}$ row, an $8^{th}$ row, a $16^{th}$ row, and a $24^{th}$ row of a 32×32 QM. As shown in FIG. 8, the 32×32 QM is downsampled to obtain a 32×4 QM, where the $0^{th}$ row, the $8^{th}$ row, the $16^{th}$ row, and the $24^{th}$ row filled with oblique lines are copied from the 32×32 QM to the 32×4 QM.

When a size of a square TB is greater than 8×8, a corresponding QM size in VTM7 is constrained to 8×8. An upsampling method is used for the 8×8 QMs to create a 16×16 QM, a 32×32 QM, and a 64×64 QM. More specifically, to create a QM with a size of 16×16, each element in a QM with a size of 8×8 corresponding to the QM with a size of 16×16 is upsampled and copied to 2×2 regions; and to create a QM with a size of 32×32, each element in a QM with a size of 8×8 corresponding to the QM with a size of 32×32 is upsampled and copied to 4×4 regions.

Up to 28 QMs need to be encoded in VTM7. In Table 1, an identifier (id) variable of a QM is determined according to variables signalingSize, matrixId, and max(nTbW, nTbH). The variable signalingSize represents a size of an encoded QM; the variable matrixId is a QM type id based on a prediction mode (predMode) and a color component (cIdx); and the variable max(nTbW, nTbH) represents the larger value of a width and a height of a TB of a luma or chroma component.

TABLE 1

| matrixId | | | signalingSize | | | | | |
|---|---|---|---|---|---|---|---|---|
| | | | 2 | 4 | 8 | 8 | 8 | 8 |
| | | | max( nTbW, nTbH ) | | | | | |
| | | | 2 | 4 | 8 | 16 | 32 | 64 |
| 0 | predMode = | cIdx = 0 (Y) | | 2 | 8 | 14 | 20 | 26 |
| 1 | MODE_INTRA | cIdx = 1 (Cb) | | 3 | 9 | 15 | 21 | 21 |
| 2 | | cIdx = 2 (Cr) | | 4 | 10 | 16 | 22 | 22 |
| 3 | predMode = | cIdx = 0 (Y) | | 5 | 11 | 17 | 23 | 27 |
| 4 | MODE_INTER | cIdx = 1 (Cb) | 0 | 6 | 12 | 18 | 24 | 24 |
| 5 | (INTER, IBC) | cIdx = 2 (Cr) | 1 | 7 | 13 | 19 | 25 | 25 |

In Table 1, MODE INTRA represents an intra-frame prediction mode, MODE INTER represents an inter-frame prediction mode, MODE IBC represents an intra block copy (IBC) prediction mode, Y represents luma, and Cb and Cr represent chroma.

2. 64×64 QM

Figure 9:
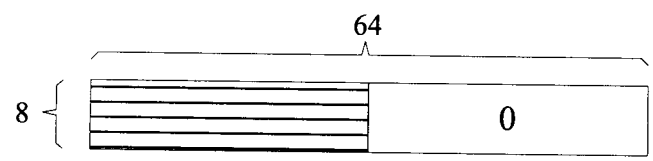
FIG. 9 is a schematic diagram of zero-out encoding according to an embodiment of this disclosure.

To reduce complexity, a zero-out design is adopted for a relatively large TB size in VVC. In addition, when zero out is performed on high-frequency coefficients of a TB with a size of 64×64, zero out is also performed on a corresponding high-frequency part of a QM. That is, if max(nTbYW, nTbYH) is equal to 64, only an upper left or right part of the coefficients is retained, and the other coefficients are set to zero. As shown in FIG. 9, a right 32×8 part of a 64×8 QM is zeroed and used for scaling of a 64×8 TB, where only coefficients of the remaining left 32×8 part are retained. In addition, the quantity of elements of a 64×64 QM is also reduced from 8×8 to three 4×4 sub-matrices, because 4×4 elements on a lower right corner are not used.

As shown in Table 1, when max(nTbYW, nTbYH) is equal to 64, an id value of a chroma QM (cIdx=1, 2) is the same as that in a previous column having the same matrixId. This means that they share one piece of 8×8 quantization matrix signaling in VVC. Each element in the 8×8 quantization matrix is upsampled and copied to a 4×4 region to generate a square 32×32 chroma QM, or copied to an 8×8 region to generate a square 64×64 chroma QM. Zero out is not applicable to the 8×8 quantization matrix because all 64 elements are used for quantizing a 32×32 chroma TB. In addition, a non-square 64×N or N×64 chroma QM is obtained by downsampling and copying a square 64×64 chroma QM.

In addition, a 64×64 luma TB usually has a QM thereof, which is shown in 26 and 27 in Table 1. Zero out is applicable to a 64×64 luma QM because 4×4 elements on a lower right corner of a corresponding 8×8 quantization matrix thereof are not used.

3. QM Encoding Manner

To reduce bit overheads, 28 QMs are encoded through intra-frame prediction encoding and inter-frame prediction encoding in VTM7.

Figure 10:
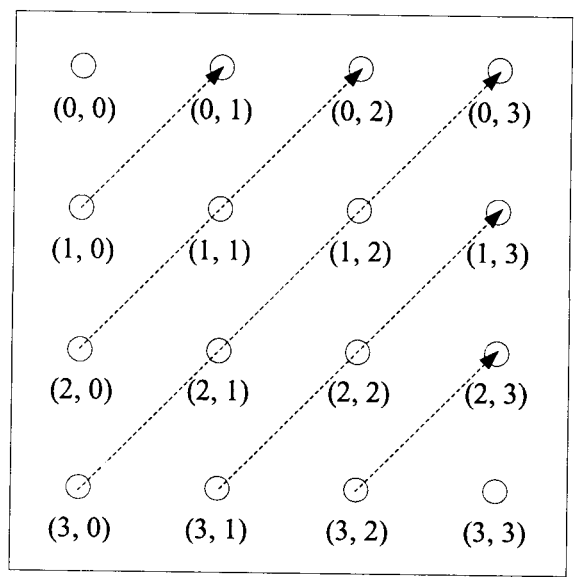
FIG. 10 is a schematic diagram of a diagonal scanning sequence according to an embodiment of this disclosure.

In the intra-frame prediction mode, differential pulse code modulation (DPCM) encoding is applied to a QM in a diagonal scanning sequence. A DPCM intra-frame residual also needs to be transmitted in a bitstream. For example, as shown in FIG. 10, a QM with a size of 4×4 is used as an example. A diagonal scanning sequence is (0, 0), (1, 0), (0, 1), (2, 0), (1, 1), . . . , (2, 3), (3, 3).

There are two inter-frame prediction modes, that is, a copy mode and a prediction mode. In the copy mode, a current QM to be encoded is completely the same as a QM available for decoding and referred to as a reference QM. This also means that the copy mode has zero inter-frame residual, and certainly, it is unnecessary to transmit a signal for residual notification. The encoder shall transmit an increment ID between the current QM and a reference QM thereof, so that the decoder may reconstruct the current QM by directly copying the reference QM. The prediction mode is similar to the copy mode, but has an additional inter-frame residual. The DPCM encoding is applied to an inter-frame residual in a diagonal scanning sequence, and the encoder needs to transmit a DPCM inter-frame residual in a bitstream.

As described above, when sizeId of a QM is greater than 3, an upsampling algorithm is used to copy each element in the QM to a large square region. A DC coefficient of a position (0, 0) is most important to video reconstruction, so that in VTM7, the DC coefficient is directly encoded, rather than being copied from corresponding elements of another QM. For each QM, bit costs of three calculate modes (that is, the copy mode in the inter-frame prediction mode, the prediction mode in the inter-frame prediction mode, and the intra-frame prediction mode) of the QM are calculated through mode decision, and one mode that has the lowest bit cost is selected as a final optimal mode. Subsequently, the optimal mode is used to encode the QM.

4. QM Signaling

VVC supports frequency-dependent quantization of a TB by using a QM. It is assumed that the QM is W, W[x][y] represents a QM weight of a transform coefficient in a position (x, y) in the TB. For a transform coefficient coeff

[x][y], a quantized transform coefficient level[x][y] is calculated by using formula 1 below:

$$\text{level}[x][y] = \left(\text{coeff}[x][y] \times \frac{16}{W[x][y] \times QP} + \text{offset}\right) \quad \text{Formula 1}$$

where QP is a quantization parameter (or may be referred to as a quantization step), and offset is an offset value. W[x][y]=16 indicates that the transform coefficient is not weighted in the position (x, y). In addition, when values of all elements in the QM is equal to 16, an effect is the same as an effect of not using a QM.

A syntax element sps_scaling_list_enable_flag of a sequence parameter set (SPS) is used for indicating whether a QM is enabled for pictures in which the SPS has been referenced as picture headers (PHs). When the flag is enabled, that is, sps_scaling_list_enable_flag is enabled, an additional flag in the PH is used for controlling whether to use a default QM of which all elements are equal to 16 or use a user-defined QM. In VTM7, a user-defined QM is notified in an adaptive parameter set (APS). If a user-defined QM is enabled in an SPS and a PH, one APS index may be transmitted in the PH, for specifying a QM set of an image in which the PH has been referenced.

In an APS, up to 28 groups of a QM encoding mode, a Δid (increment id), an AC coefficient, and a DC coefficient shall be notified. In each APS, 28 groups of QMs are encoded and decoded in ascending order of ids.

In VVC draft 7, syntaxes and semantics of the QM coding mode, the Δid (increment id), the AC coefficient, and the DC coefficient are defined in Table 2 below:

The flag scaling_list_copy_mode_flag[id] being equal to 1 indicates that an element value of a current QM is the same as an element value of a reference QM of the current QM. The reference QM is represented by scaling_list_pred_id_delta[id]. scaling_list_copy_mode_flag[id] being equal to 0 indicates that scaling_list_pred_mode_flag exists.

The flag_scaling_list_pred_mode_flag[id] being equal to 1 indicates that the current QM can be predicted from the reference QM. The reference QM is represented by scaling_list_pred_id_delta[id]. scaling_list_pred_mode_flag[id] being equal to 0 indicates that the element value of the current QM is notified by explicitly transmitting a signal. When scaling_list_pred_mode_flag[id] does not exist, a value thereof is deduced to be equal to 0.

The variable scaling_list_pred_id_delta[id] represents a reference QM used for deducing a prediction QM, that is, ScalingMatrixPred[id]. When scaling_list_pred_id_delta[id] does not exist, a value thereof is deduced to be equal to 0. The value of scaling_list_pred_id_delta[id] shall be within a range of 0 to maxIdDelta. maxIdDelta is deduced according to an id, which is shown in Formula 2 below:

$$\text{maxIdDelta} = id < 2 ? id((id<8)?(id-2):(id-8)) \quad \text{Formula 2}$$

That is, if id<2, maxIdDelta=id; if id≥2 and id<8, maxIdDelta=id−2; and if id>8, maxIdDelta=id−8.

Variables refId and matrixSize are calculated by using the following formulas:

$$\text{refId} = id - \text{scaling\_list\_pred\_}id\_\text{delta}[id] \quad \text{Formula 3}$$

$$\text{matrixSize} = (id<2)?2:((id<8)?4:8) \quad \text{Formula 4}$$

That is, if id<2, matrixSize=2; if id≥2 and id<8, matrixSize=4; and if id≥8, matrixSize=8.

TABLE 2

| | Descriptor |
|---|---|
| scaling_list_data( ) { | |
|   scaling_matrix_for_lfnst_disabled_flag | u(1) |
|   for( id = 0; id < 28; id ++ ) | |
|     matrixSize = ( id < 2 ) ? 2 : ( ( id < 8 ) ? 4 : 8 ) | |
|     scaling_list_copy_mode_flag[ id ] | u(1) |
|     if( !scaling_list_copy_mode_flag[ id ] ) | |
|       scaling_list_pred_mode_flag[ id ] | u(1) |
|     if( ( scaling_list_copy_mode_flag[ id ] \|\| scaling_list_pred_mode_flag[ id ] ) && | |
|       id != 0 && id != 2 && id != 8 ) | |
|       scaling_list_pred_id_delta[ id ] | ue(v) |
|     if( !scaling_list_copy_mode_flag[ id ] ) { | |
|       nextCoef = 0 | |
|       if( id > 13 ) { | |
|         scaling_list_dc_coef[ id − 14 ] | se(v) |
|         nextCoef += scaling_list_dc_coef[ id − 14 ] | |
|       } | |
|       for( i = 0; i < matrixSize * matrixSize; i++ ) { | |
|         x = DiagScanOrder[ 3 ][ 3 ][ i ][ 0 ] | |
|         y = DiagScanOrder[ 3 ][ 3 ][ i ][ 1 ] | |
|         if( !( id > 25 && x >= 4 && y >= 4 ) ) { | |
|           scaling_list_delta_coef[ id ][ i ] | se(v) |
|           nextCoef += scaling_list_delta_coef[ id ][ i ] | |
|         } | |
|         ScalingList[ id ][ i ] = nextCoef | |
|       } | |
|     } | |
|   } | |
| } | |

A QM prediction matrix of matrixSize×matrixSize is represented as ScalingMatrixPred[x][y], where x∈[0, matrixSize−1], y∈[0, matrixSize−1]; and a variable ScalingMatrixDCPred is represented as a predicted value of DC, which are calculated as follows:

When both scaling_list_copy_mode_flag[id] and scaling_list_pred_mode_flag[id] are equal to 0, all elements of ScalingMatrixPred are set to be equal to 8, and a value of ScalingMatrixDCPred is set to be equal to 8.

Otherwise, when scaling_list_pred_id_delta[id] is equal to 0, all elements of ScalingMatrixPred are set to be equal to 16, and a value of ScalingMatrixDCPred is set to be equal to 16.

Otherwise, when scaling_list_copy_mode_flag[id] or scaling_list_pred_mode_flag[id] is equal to 1, and scaling_list_pred_id_delta[id] is greater than 0, ScalingMatrixPred is set to be equal to ScalingMatrixPred[refId], and a value of ScalingMatrixDCPred is calculated as follows: is refId is greater than 13, a value of ScalingMatrixDCPred is set to be equal to ScalingMatrixDCRec[refId−14]; otherwise, (that is, refId is less than or equal to 13), a value of ScalingMatrixDCPred is set to be equal to ScalingMatrixPred[0][0].

The value scaling_list_dc_coef[id−14] is used to calculate a value of a variable ScalingMatrixDC[id−14] when an id is greater than 13, which is shown in Formula 5 below:

ScalingMatrixDCRec[id−14]=(ScalingMatrixDCPred+scaling_list_dc_coef[id−14]+256) %256)    Formula 5 where % represent obtaining of a remainder.

When scaling_list_dc_coef[id−14] does not exist, a value thereof is deduced to be equal to 0. The value of scaling_list_dc_coef[id−14] shall be within a range of −128 to 127 (including −128 and 127). The value of ScalingMatrixDCRec[id−14] shall be greater than 0.

The value scaling_list_delta_coef[id][i] represents a difference between ScalingList[id][i] and a previous matrix coefficient ScalingList[id][i−1] when scaling_list_copy_mode_flag[id] is equal to 0. The value of scaling_list_delta_coef[id][i] shall be within a range of −128 to 127 (including −128 and 127). When scaling_list_copy_mode_flag[id] is equal to 1, all elements of ScalingList[id] are set to be equal to 0.

ScalingMatrixRec[id] of a QM of matrixSize×matrixSize may be calculated by using Formula 6 below:

ScalingMatrixRec[id][x][y]=(ScalingMatrixPred[x][y]+ScalingList[id][k]+256)%256)    Formula 6 where % represents obtaining of a remainder, k∈[0, (matrixSize×matrixSize−1)].

x=DiagScanOrder[Log 2(matrixSize)][Log 2(matrixSize)][k][0], and y=DiagScanOrder[Log 2(matrixSize)][Log 2(matrixSize)][k][1].

A value of ScalingMatrixRec[id][x][y] shall be greater than 0.

A decoding process, that is, a process of performing decoding according to the foregoing syntax elements to obtain ScalingMatrixRec[id][x][y] and ScalingMatrixDCRec, of a QM is considered.

5. Color Format

In the VVC draft 7, SPS syntax and semantic definitions related to the color format
are shown in Table 3 below:

TABLE 3

|  | Descriptor |
|---|---|
| seq_parameter_set_rbsp( ) { | |
| ... | |
| chroma_format_idc | u(2) |
| if( chroma_format_idc == 3 ) | |
| separate_colour_plane_flag | u(1) |
| ... | |
| } | |

The variable chroma_format_idc represents the sampling rate of the chroma component relative to the luma component, which is shown in Table 4.

TABLE 4

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

In Table 4, SubWidthC and SubHeightC respectively represent a width and a height of a coding tree unit (CTU) corresponding to a chroma component, and Monochrome indicates that there is no chroma component. chroma_format_idc being equal to 1 is used as an example. A corresponding chroma format thereof is 4:2:0, which indicates that a width of a luma TB is twice a width of a chroma TB, and a height of the luma TB is twice a height of the chroma TB. chroma_format_idc being equal to 2 is used as an example. A corresponding chroma format thereof is 4:2:2, which indicates that a width of a luma TB is twice a width of a chroma TB, and a height of the luma TB is the same as a height of the chroma TB. chroma_format_idc being equal to 3 is used as an example. A corresponding chroma format thereof is 4:4:4, which indicates that a width of a luma TB is the same as a width of a chroma TB, and a height of the luma TB is the same as a height of the chroma TB. In addition, chroma_format_idc being equal to 0 and a corresponding chroma format thereof being 4:0:0 indicates that there is no chroma component.

The flag separate_colour_plane_flag being equal to 1 indicates that three color components of a 4:4:4 chroma format are separately encoded. separate_colour_plane_flag being equal to 0 indicates that a color component is not separately encoded. When separate_colour_plane_flag does not exist, a value thereof is deduced to be 0.

When separate_colour_plane_flag is equal to 1, an encoded image is formed by three separate components, and each component is formed by encoded samples of a color plane (Y, Cb or Cr), and a monochrome encoding syntax is used. In this case, each color plane is associated with a specified colour_plane_id value.

The variable colour_plane_id specifies a color plane associated with a slice associated with a PH. When separate_colour_plane_flag is equal to 1, a value of colour_plane_id shall be within a range of 0 to 2 (including 0 and 2). Values 0, 1, and 2 of colour_plane_id respectively correspond to the planes Y, Cb, and Cr. There is no dependency between decoding processes of images having different colour_plane_id values.

A width and a height of each chroma coding tree block (CTB), that is, variables CtbWidthC and CtbHeightC are determined in the following manner:

If chroma_format_idc is equal to 0 (there is no chroma component) or separate color plane flag is equal to 1, both CtbWidthC and CtbHeightC are equal to 0.

Otherwise, CtbWidthC and CtbHeightC are calculated by using the formulas below:

$$CtbWidthC = CtbSizeY / SubWidthC \quad \text{Formula 7}$$

$$CtbHeightC = CtbSizeY / SubHeightC \quad \text{Formula 8}$$

where CtbSizeY represents a size of a luma CTB.

In a method for encoding a QM currently used in VVC, all of 28 QMs are encoded and transmitted in an APS, and a size of each QM is a predefined fixed size, resulting in relatively low flexibility in QM encoding and decoding, and low codeword utilization of QM signaling, which increases the computational complexity of the decoder side. According to the technical solution provided in this embodiment of this disclosure, by determining a chroma format of a to-be-decoded video frame; determining, when a currently decoded QM is a chroma QM, a size of the currently decoded QM according to the chroma format and a size of a luma TB; and decoding the currently decoded QM when it is determined that the size of the currently decoded QM is greater than 0, a size of a chroma QM is flexibly determined according to a chroma format and a size of a luma TB, rather than a fixed size predefined according to an identifier (id) of the QM, thereby improving flexibility during encoding and decoding of the chroma QM. In addition, according to a size of a currently decoded QM, whether the QM needs to be decoded can be determined, so as to selectively decode QMs, thereby helping reduce computational complexity of a decoder side.

The technical solution provided in the embodiments of this disclosure may be applied to the H.266/VCC standard or a next generation of video encoding and decoding standard. This is not limited in this embodiment of this disclosure.

In the video decoding method provided in the embodiments of this disclosure, an execution entity of the steps is a decoder side device, and in the video encoding method provided in the embodiments of this disclosure, an execution entity of the steps is an encoder side device. Both the decoder side device and the encoder side device may be computer devices. The computer device refers to an electronic device having data computation, processing, and storage capabilities, such as a PC, a mobile phone, a tablet computer, a media player, a dedicated video conference device, or a server.

In addition, the methods provided in this disclosure may be used alone or combined with other methods in any order. The encoder and decoder based on the methods provided in this disclosure may be implemented by processing circuitry, e.g., one or more processors or one or more integrated circuits. The technical solutions of this disclosure are described below by using several embodiments.

Figure 11:
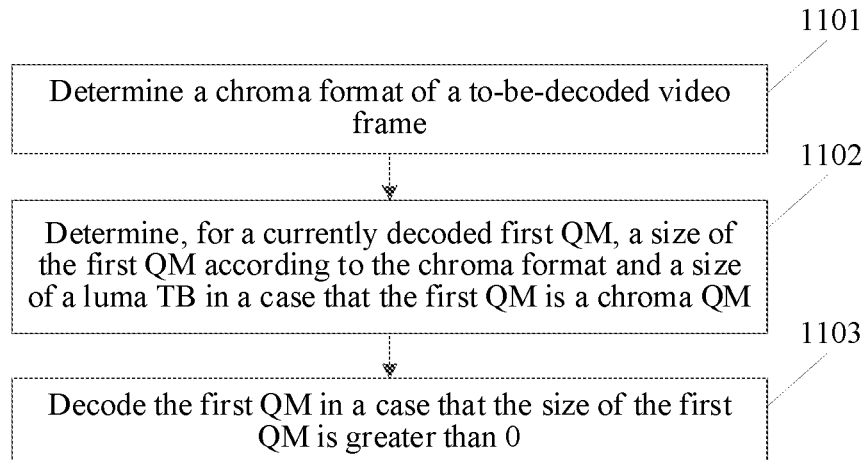
FIG. 11 is a flowchart of a video decoding method according to an embodiment of this disclosure.

FIG. 11 is a flowchart of a video decoding method according to an embodiment of this disclosure. In this embodiment, descriptions are made mainly by using an example in which the method is applied to the decoder side device introduced above. The method may include the following steps (1101 to 1103).

In Step 1101, a chroma format of a video frame is determined.

The video frame may be any to-be-decoded video frame (or referred to as an image frame) in a to-be-decoded video. The chroma format determines a sampling rate of a chroma component relative to a luma component. The chroma format can include, but is not limited to, at least one of the following: 4:0:0, 4:2:0, 4:2:2, 4:4:4. For a sampling rate corresponding to each chroma format, reference may be made to the foregoing descriptions of Table 4. Details are not described herein again.

This step may include the following sub-steps:
1. obtaining a first parameter set corresponding to a video frame; and
2. determining the chroma format of the video frame according to a first syntax element included in the first parameter set.

The first syntax element is a syntax element used for defining a chroma format.

For example, the first parameter set is an SPS, the first syntax element may correspondingly be chroma_format_idc, and the chroma format of the to-be-decoded video frame can be determined by obtaining a value corresponding to chroma_format_idc. For example, with reference to Table 4, if chroma_format_idc is equal to 0, it can be determined that the chroma format of the to-be-decoded video frame is 4:0:0; if chroma_format_idc is equal to 1, it can be determined that the chroma format of the to-be-decoded video frame is 4:2:0; if chroma_format_idc is equal to 2, it can be determined that the chroma format of the to-be-decoded video frame is 4:2:2; and if chroma_format_idc is equal to 3, it can be determined that the chroma format of the to-be-decoded video frame is 4:4:4.

In another example, the first parameter set is a parameter set including related syntax elements used for defining a QM. For example, the decoder side device may obtain a QM through decoding according to a syntax element included in the first parameter set. The first parameter set can be an APS, the first syntax element may correspondingly be aps_chroma_format_idc, and the chroma format of the to-be-decoded video frame can be determined by obtaining a value corresponding to aps_chroma_format_idc. In addition, a correspondence between the value of aps_chroma_format_idc and the chroma format may be predefined. For example, the correspondence between the value of aps_chroma_format_idc and the chroma format may be predefined to be the same as a correspondence between the value of chroma_format_idc and the chroma format. In this way, if aps_chroma_format_idc is equal to 0, it can be determined that the chroma format of the to-be-decoded video frame is 4:0:0; if aps_chroma_format_idc is equal to 1, it can be determined that the chroma format of the to-be-decoded video frame is 4:2:0; if aps_chroma_format_idc is equal to 2, it can be determined that the chroma format of the to-be-decoded video frame is 4:2:2; and if aps_chroma_format_idc is equal to 3, it can be determined that the chroma format of the to-be-decoded video frame is 4:4:4.

Compared with determining a chroma format of a video frame according to the syntax elements included in the SPS, by defining related syntax elements in the APS, and determining a chroma format of a video frame according to the related syntax elements defined in the APS, parsing dependency between the APS and the SPS bitstreams can be eliminated, so that decoding of the APS does not need to depend on the syntax elements of the SPS.

In Step 1102, for a currently decoded first QM, a size of the first QM is determined according to the chroma format and a size of a luma TB, when the first QM is a chroma QM.

The video may be any QM. When decoding the first QM, the decoder side device may determine whether the first QM is a luma QM or a chroma QM according to an id of the first QM and with reference to a correspondence between an id of a predefined QM and a QM type id. For example, it is assumed that the correspondence between the id of the predefined QM and the QM type id is shown in Table 1. For example, if the id of the first QM is 2, the first QM is a luma QM; and if the id of the first QM is 4, the first QM is a chroma QM.

If the decoder-side device determines that the first QM is a chroma QM, the decoder side device determines a size of the first QM according to the chroma format and a size of a luma TB. For example, the chroma format is 4:2:0, and the size of the luma TB is 4×4, then the size of the first QM is 2×2. In another example, the chroma format is 4:4:4, and the size of the luma TB is 4×4, then the size of the first QM is 4×4. In still another example, the chroma format is 4:0:0, and the size of the luma TB is 4×4, then the size of the first QM is 0, that is, it indicates that there is no chroma component.

The decoder-side device can determines the size of the first QM according to the chroma format and a larger value of a width and a height of the luma TB. When the width of the luma TB is greater than the height of the luma TB, the larger value of the width and the height of the luma TB is the width of the luma TB; when the width of the luma TB is less than the height of the luma TB, the larger value of the width and the height of the luma TB is the height of the luma TB; and when the width of the luma TB is equal to the height of the luma TB, because the two are equal, the larger value of the width and the height of the luma TB may be either of the width or the height. For example, when the size of the luma TB is 8×4, assuming that the chroma format is 4:2:0, the size of the first QM is 4×4

In Step 1103, the first QM is decoded when the size of the first QM is greater than zero.

The size of the first QM being equal to 0 indicates that there is no chroma component, and the size of the first QM being greater than 0 indicates that there is a chroma component. When the size of the first QM is greater than 0, the size of the first QM may be 2×2, 4×4, or 8×8. Certainly, when the size of the first QM is greater than 0, the size thereof may alternatively be sizes other than those listed above. This is not limited in the embodiments of this disclosure.

When it is determined that the size of the first QM is greater than 0, the decoder side device decodes the first QM. For example, the decoder side device may further read a syntax element related to the QM from the APS, and obtains values of elements included in the first QM through decoding according to the syntax element.

This step may include the following sub-steps.

1: Determining, when it is determined that the first QM is decoded in a copy mode or a prediction mode and a predefined first variable indicates existence of a reference QM corresponding to the first QM, the reference QM; and 2: Determining the first QM according to the reference QM.

When decoding the first QM, the decoder side device may determine, according to a syntax element related to the QM in the APS, whether to use a copy mode or a prediction mode (including the prediction mode of the inter-frame prediction mode and the intra-frame prediction mode described above) to decode the first QM. If it is determined that first QM is decoded in the copy mode or the prediction mode, a value of the first variable is further determined according to the related syntax element in the APS, and then whether a reference QM exists is determined according to the value of the first variable. If the value of the first variable indicates that a reference QM corresponding to the first QM exists, values of elements included in the first QM are determined according to the reference QM. If it is determined that the first QM is decoded in the copy mode, the reference QM is directly determined as the first QM, because the first QM is the same as the reference QM. If it is determined that the first QM is decoded in the prediction mode, a prediction QM is calculated according to the reference QM, and then the first QM is calculated with reference to the prediction QM and a DPCM residual.

When the first QM is a chroma QM, and the size of the first QM is equal to 0, the decoder-side device can determine all the elements in the first QM as a default value. The default value can be 16. With reference to Formula 1, because scaling quantization coefficients of all transform coefficients in a TB are 1 in this case, an effect is the same as an effect of not using a QM.

When the first QM is a luma QM, the decoder side device can directly decode the first QM according to the syntax element related to the QM in the APS.

When the chroma format is 4:2:0, and it is determined that the first QM is a chroma QM with a size of 2×2 according to the chroma format and the size of the luma TB, the decoder side device can determine all the elements in the first QM as having a default value. Similarly, the default value may be 16. That is, for a video with a chroma format of 4:2:0, the APS does not encode a chroma QM with a size of 2×2, and for the chroma QM with a size of 2×2, all elements thereof may be predefined by a default value.

Based on the above, according to the technical solution provided in this embodiment of this disclosure, by determining a chroma format of a video frame; determining, when a currently decoded QM is a chroma QM, a size of the currently decoded QM according to the chroma format and a size of a luma TB; and decoding the currently decoded QM when it is determined that the size of the currently decoded QM is greater than 0, a size of a chroma QM is flexibly determined according to a chroma format and a size of a luma TB, rather than a fixed size predefined according to an identifier (id) of the QM, thereby improving flexibility during encoding and decoding of the chroma QM. In addition, according to a size of a currently decoded QM, whether the QM needs to be decoded can be determined, so as to selectively decode QMs, thereby helping reduce computational complexity of a decoder side.

In addition, by adding the first syntax element used for indicating definition of the chroma format in the first parameter set of related syntax elements used for defining a QM, parsing dependency between bitstreams during QM decoding can be eliminated.

In addition, for a video with a chroma format of 4:0:0, because the video has no chroma component, it is unnecessary to encode a chroma QM thereof, which helps reduce bit overheads of QM signaling. Correspondingly, during decoding, when it is determined that the chroma format is 4:0:0, that is, it is determined that a size of a currently decoded chroma QM is 0, the chroma QM does not need to be decoded, so that the computational complexity of the decoder side is further reduced.

With reference to Table 1, a problem of inconsistency between encoding of a chroma QM and a luma QM exists in VVC, because VVC needs to support videos in a plurality of chroma formats such as 4:0:0, 4:2:0, 4:2:2, and 4:4:4. With reference to Table 1 and Table 4, for a video with chroma formats 4:2:2 and 4:4:4, the APS explicitly encodes an 8×8 QM for each luma QM with a size of 64×64; but for a chroma QM with a reconstruction size of 64×64, an 8×8 QM needs to be reused with a 32×32 luma QM corresponding to the chroma QM, resulting in a problem of inconsistency between encoding of the chroma QM and the luma QM.

In the exemplary embodiments provided in this disclosure, a luma QM and a chroma QM with a reconstruction size of 64×64 and the same type of luma QM and chroma QM with a reconstruction size of 32×32 have encoding QMs independent of each other. A size of the encoding QM may be 8×8. The type refers to a QM type determined according to a prediction mode (predMode) and a color component (cIdx), which may be represented by using a variable matrixId. A correspondence between the variable matrixId, the prediction mode (predMode) and the color component (cIdx) may be shown in Table 1. The difference from Table 1 is that in the embodiments of this disclosure, a chroma QM with a reconstruction size of 64×64 and a same type of chroma QM with a reconstruction size of 32×32 have encoding QMs with a size of 8×8 independent of each other rather than reusing the same encoding QM, so that encoding of the chroma QM and the luma QM are more consistent.

For example, Table 5 shows a correspondence between a QM id, matrixId, and maxTbYWH according to an embodiment of this disclosure. The variable matrixId is a QM type id based on a prediction mode (predMode) and a color component (cIdx), and the variable maxTbYWH is the larger value of a width and a height of a luma TB.

TABLE 5

| matrixId | | | maxTbYWH | | | | |
|---|---|---|---|---|---|---|---|
| | | | 4 | 8 | 16 | 32 | 64 |
| 0 | predMode = | cIdx = 0 (Y) | 0 | 6 | 12 | 18 | 24 |
| 1 | MODE_INTRA | cIdx = 1 (Cb) | 1 | 7 | 13 | 19 | 25 |
| 2 | | cIdx = 2 (Cr) | 2 | 8 | 14 | 20 | 26 |
| 3 | predMode = | cIdx = 0 (Y) | 3 | 9 | 15 | 21 | 27 |
| 4 | MODE_INTER | cIdx = 1 (Cb) | 4 | 10 | 16 | 22 | 28 |
| 5 | (INTER, IBC) | cIdx = 2 (Cr) | 5 | 11 | 17 | 23 | 29 |

It can be seen from Table 5 that a value range of the QM id is a closed interval [0,29], and a luma QM and a chroma QM with a reconstruction size of 64×64 and the same type of luma QM and chroma QM with a reconstruction size of 32×32 have encoding QMs with a size of 8×8 independent of each other. That is, QMs with matrixId of 0 to 5 and a reconstruction size of 64×64 and a QM with the same matrixId and a reconstruction size of 32×32 have encoding QMs with a size of 8×8 independent of each other. The ids of the QMs with matrixId of 0 to 5 and a reconstruction size of 64×64 are sequentially 24, 25, 26, 27, 28, and 29.

Zero-out encoding is not only used in a luma QM with a reconstruction size of 64×64, but can be also used in a chroma QM with a reconstruction size of 64×64. Zero-out encoding for a QM is used to zero some element values in the QM, to reduce QM encoding signaling overheads. Correspondingly, the first QM is decoded by using a decoding scheme corresponding to a zero-out encoding scheme when the first QM corresponds to the luma QM or chroma QM with a reconstruction size of 64×64. An example in which the first QM is decoded is still used is discussed. When the first QM corresponds to a QM with a reconstruction size of 64×64, when the first QM is a chroma QM and the chroma format is 4:2:2, it is determined that element values of a 4×8 region of a right half part of the first QM are 0; otherwise (that is, the first QM is a luma QM, or the first QM is a chroma QM and the chroma format is 4:4:4), it is determined that element values of a 4×4 region of a lower right corner part of the first QM are 0.

In an exemplary embodiment, an example in which the first parameter set is an APS is used. Syntax elements included in the APS and a syntax structure table may be shown in Table 6 below.

TABLE 6

| | Descriptor |
|---|---|
| scaling_list_data( ) { | |
|   scaling_matrix_for_lfnst_disabled_flag | u(1) |
|   aps_chroma_format_idc | u(2) |
|   for( id = 0; id < 29; id ++ ) { | |
|     if (matrixSize>0){ | |
|       scaling_list_copy_mode_flag[ id ] | u(1) |
|       if( !scaling_list_copy_mode_flag[ id ] ) | |
|         scaling_list_pred_mode_flag[ id ] | u(1) |
|       if( ( scaling_list_copy_mode_flag[ id ] \|\| | |
|       scaling_list_pred_mode_flag [ id ] ) && | |
|       sizePresentFlag[log(matrixSize)-1]) | |
|         scaling_list_pred_id_delta[ id ] | ue(v) |
|       if( !scaling_list_copy_mode_flag[ id ] ) { | |
|         nextCoef = 0 | |
|         if(matrixRecSize >= 16 ) { | |
|           scaling_list_dc_coef[ id − 12 ] | se(v) |
|           nextCoef += scaling_list_dc_coef[ id − 12] | |
|         } | |
|         for( i = 0; i < matrixSize * matrixSize; i++ ) { | |
|           x = DiagScanOrder[ 3 ][ 3 ][ i ][ 0 ] | |
|           y = DiagScanOrder[ 3 ][ 3 ][ i ][ 1 ] | |
|           if(matrixRecSize < 64 \|\| zeroOutFlag[x][y]){ | |
|             scaling_list_delta_coef[ id ][ i ] | se(v) |
|             nextCoef += scaling_list_delta_coef[ id ][ i ] | |
|           } | |
|           ScalingList[ id ][ i ] = nextCoef | |
|         } | |
|       } | |
|     } | |
|   } | |
| } | |

The variable aps_chroma_format_idc indicates the sampling rate of the chroma component relative to the luma component, which is specifically shown in Table 4. The value thereof is specified to be the same as a value of a syntax element chroma_format_idc.

The flag scaling_list_copy_mode_flag[id] being equal to 1 indicates that an element value of a current QM is the same as an element value of a reference QM of the current QM. The reference QM is represented by scaling_list_pred_id_delta[id]. scaling_list_copy_mode_flag[id] being equal to 0 indicates that scaling_list_pred_mode_flag exists.

The flag scaling_list_pred_mode_flag[id] being equal to 1 indicates that the current QM can be predicted from the reference QM. The reference QM is represented by scaling_list_pred_id_delta[id]. scaling_list_pred_mode_flag[id] being equal to 0 indicates that the element value of the current QM is notified by explicitly transmitting a signal. When scaling_list_pred_mode_flag[id] does not exist, a value thereof is deduced to be equal to 0.

As shown in table 6, when a syntax element scaling_list_copy_mode_flag is equal to 1 or a syntax element scaling_list_pred_mode_flag is equal to 1, and the first variable sizePresentFlag[log(matrixSize)−1] is equal to 1, the reference QM is determined according to a syntax element scaling_list_pred_id_delta. The syntax element scaling_list_copy_mode_flag being equal to 1 indicates that the current QM is decoded in the copy mode, the syntax element scaling_list_pred_mode_flag being equal to 1 indicates that the current QM is decoded in the prediction mode, and the first variable sizePresentFlag[log(matrixSize)−1] being equal to 1 indicates existence of the reference QM corresponding to the current QM.

The variable scaling_list_pred_id_delta[id] is used for indicating a reference QM. The reference QM is used for exporting a prediction QM (that is, ScalingMatrixPred[id]). When the syntax element does not exist, scaling_list_pred_id_delta[id] is deduced to be 0. A value range of scaling_list_pred_id_delta[id] is a closed interval [0, maxIdDelta]. maxIdDelta is exported from the variable matrixSize, which is specifically shown in Formula 9 below:

maxIdDelta=(matrixSize−2)?id−4:((matrixSize−4)? (id):(id−6))  Formula 9 where maxIdDelta represents a largest value of an id difference between a current QM and a reference QM thereof, matrixSize represents a size of the current QM, and ?: is a ternary condition operator.

The variables rend, matrixSize, and matrixRecSize are exported by using the following formula:

rend=id−scaling_list_pred_id_delta[id]  Formula 10 matrixRecSize=(cIdx==0)?maxTbYWH:(aps_chroma_format_idc==0?0: maxTbYWH/SubHeightC)  Formula 11

After using Formula 11, matrixRecSize is further modified, which is shown in the following formula:

matrixRecSize=(aps_chroma_format_idc==1&& (matrixId=1||matrixId=2))?0:matrixRecSize  Formula 12 matrixSize=matrixRecSize>8?8:matrixRecSize  Formula 13 where maxTbYWH represents the larger value of a width and a height of a luma TB; and matrixRecSize represents a reconstruction size of the current QM, which is also referred to as a size of a reconstructed QM corresponding to the current QM.

An export process of ScalingMatrixPred[x][y] (where a size is matrixSize, a value of x is [0, matrixSize−1], and a value of y is [0, matrixSize−1]) and the variable ScalingMatrixDCPred (a DC coefficient of a prediction QM) are determined as follows.

If both scaling_list_copy_mode_flag[id] and scaling_list_pred_mode_flag[id] are equal to 0, all elements of ScalingMatrixPred are set to 8, and a value of ScalingMatrixDCPred is set to 8.

If scaling_list_pred_id_delta[id] is equal to 0, all elements of ScalingMatrixPred are set to 16, and ScalingMatrixDCPred is also set to 16.

Otherwise (scaling_list_copy_mode_flag[id] or scaling_list_pred_mode_flag[id] is equal to 1 and scaling_list_pred_id_delta[id] is greater than 0), ScalingMatrixPred is set to ScalingMatrixRec[rend]. ScalingMatrix[refId] may represent an id value of the reference QM. In this case, an export process of ScalingMatrixDCPred is as follows.

If matrixRecSize is greater than or equal to 16, ScalingMatrixDCPred is set to ScalingMatrixDCRec[rend −12]. ScalingMatrixDCRec[rend −12] may represent a DC coefficient corresponding to the reference QM.

If matrixRecSize is less than 16, ScalingMatrixDCPred is set to ScalingMatrixPred[0][0].

The variable scaling_list_dc_coef[id−12] is used for exporting a value of the variable ScalingMatrixDCRec[id−12] when matrixRecSize is greater than or equal to 16, which is specifically shown in the following formula:

ScalingMatrixDCRec[id−12]=(ScalingMatrixDCPred+scaling_list_dc_coef[id−12]+256) %256)

When scaling_list_dc_coef[id−12] does not exist, a value thereof is specified to be 0. A value range of scaling_list_dc_coef[id−12] is a closed interval [−128,127]. A value of ScalingMatrixDCRec[id−12] is specified to be greater than 0.

In addition, an export process of the first variable sizePresentFlag[i] is as follows.

The flag sizePresentFlag[i] is first initialized to 0, where a value range of i is a closed interval [0, 2].

When decoding of each QM is completed, a value of sizePresentFlag[log(matrixSize)−1] is set to 1.

When a value of matrixRecSize is 64, an export process of the variable zeroOutFlag[x][y] is as follows.

If cIdx of the current QM is greater than 0, and a value of aps_chroma_format_idc is 2, that is, when the currently decoded QM is a chroma QM and the chroma format 4:2:2, if x is greater than 4, zeroOutFlag[x][y] is set to 1; otherwise, zeroOutFlag[x][y] is set to 0.

If cIdx of the current QM is 0, that is, the currently decoded QM is a luma QM, if both x and y are greater than 4, zeroOutFlag[x][y] is set to 1; otherwise, zeroOutFlag[x][y] is set to 0.

The variable zeroOutFlag[x][y] being set to 1 indicates that an element value of a position (x, y) of a QM with a size of 8×8 is zeroed; and zeroOutFlag[x][y] being set to 0 indicates that the element value of the position (x, y) of the QM with a size of 8×8 is not zeroed.

In an exemplary embodiment, the same encoding QM is reused for chroma QMs with a reconstruction size of 64×64 and the same prediction mode (predMode). A size of the encoding QM may be 8×8. For example, FIG. 7 below shows a correspondence between an QM id, matrixId, sizeId, and matrixRecSize according to an embodiment of this disclosure. The variable matrixId is a QM type id based on a prediction mode (predMode) and a color component (cIdx). The variable sizeId represents a size of a QM, and a definition standard of sizeId is shown in Table 8. The variable matrixRecSize represents a reconstruction size of the QM.

TABLE 7

|  |  |  | sizeId | | | | | |
| --- | --- | --- | --- | --- | --- | --- | --- | --- |
|  |  |  | 2 | 4 | 8 | 8 | 8 | 8 |
|  |  |  |  |  | matrixRecSize | | | |
| matrixId |  |  | 2 | 4 | 8 | 16 | 32 | 64 |
| 0 | predMode = | cIdx = 0 (Y) |  | 2 | 8 | 14 | 20 | 26 |
| 1 | MODE_INTRA | cIdx = 1 (Cb) |  | 3 | 9 | 15 | 21 | 27 |
| 2 |  | cIdx = 2 (Cr) |  | 4 | 10 | 16 | 22 | 27 |
| 3 | predMode = | cIdx = 0 (Y) |  | 5 | 11 | 17 | 23 | 28 |
| 4 | MODE_INTER | cIdx = 1 (Cb) | 0 | 6 | 12 | 18 | 24 | 29 |
| 5 | (INTER, IBC) | cIdx = 2 (Cr) | 1 | 7 | 13 | 19 | 25 | 29 |

TABLE 8

| Size of QM | sizeId | | Decoded QM Parameter ( ) |
|---|---|---|---|
| 2 × 2 | 1 | 2 × 2 | — |
| 4 × 4 | 2 | 4 × 4 | — |
| 8 × 8 | 3 | 8 × 8 | — |
| 16 × 16 | 4 | 8 × 8 | 1 DC |
| 32 × 32 | 5 | 8 × 8 | 1 DC |
| 64 × 64 | 6 | 8 × 8 | 1 DC |

It can be seen from Table 7 that a value range of the QM id is a closed interval [0,29], and the same encoding QM is reused for chroma QMs with a reconstruction size of 64×64 and the same prediction mode (predMode). That is, the same encoding QM whose id is 27 is reused for a QM corresponding to chroma Cb and a QM corresponding to chroma Cr that meet predMode=MODE INTRA and have a reconstruction size of 64×64; and the same encoding QM whose id is 29 is reused for a QM corresponding to chroma Cb and a QM corresponding to chroma Cr that meet predMode=MODE INTER (INTER, IBC) and have a reconstruction size of 64×64.

In Table 8, when sizeId is greater than 3, there is a direct current (DC) coefficient, and the DC coefficient is an element value in a position (0, 0) in a QM. In VVC, when a DC value is 0, a default QM is used as the QM, but the QM is still transmitted. A main reason is that for an unencoded QM, reference may be made to the QM. When the DC value is not 0, a user-defined QM is used as the QM, and the QM is encoded in an encoding manner described below for transmission.

In an exemplary embodiment, an example in which the first parameter set is an APS is used. Syntax elements included in the APS and a syntax structure table may be shown in Table 9 below:

TABLE 9

| | Descriptor |
|---|---|
| scaling_list_data( ) { | |
|   scaling_matrix_for_lfnst_disabled_flag | u(1) |
|   for( id = 0; id < 29; id ++ ) { | |
|     matrixSize = (id < 2 ) ? 2 : ( ( id < 8 ) ? 4 : 8 ) | |
|     scaling_list_copy_mode_flag[ id ] | u(1) |
|     if( !scaling_list_copy_mode_flag[ id ] ) | |
|       scaling_list_pred_mode_flag[ id ] | u(1) |
|     if( ( scaling_list_copy_mode_flag[ id ] | | scaling_list_pred_mode_flag[id] ) && id != 0 && id != 2 && id != 8) | |
|       scaling_list_pred_id_delta[ id ] | ue(v) |
|     if( !scaling_list_copy_mode_flag[ id ] ) { | |
|       nextCoef = 0 | |
|       if( id > 13 ) { | |
|         scaling_list_dc_coef[ id − 14 ] | se(v) |
|         nextCoef += scaling_list_dc_coef[ id − 14 ] | |
|       } | |
|       for( i = 0; i < matrixSize * matrixSize; i++ ) { | |
|         x = DiagScanOrder[ 3 ][ 3 ][ i ][ 0 ] | |
|         y = DiagScanOrder[ 3 ][ 3 ][ i ][ 1 ] | |
|         if( !( id > 25 && x >= 4 && y >= 4 ) ) { | |
|           scaling_list_delta_coef[ id ][ i ] | se(v) |
|           nextCoef += scaling_list_delta_coef[ id ][ i ] | |
|         } | |
|         ScalingList[ id ][ i ] = nextCoef | |
|       } | |
|     } | |
|   } | |
| } | |

It can be seen from Table 9 that, if a value of the variable id is greater than 25 and both x and y are greater than 4, zero-out encoding is used in the 4×4 sub-matrix in the lower right corner. An element of ScalingMatrixRec[id][x][y] corresponding to the sub-matrix is set to 0.

In the foregoing embodiment, a chroma QM with a reconstruction size of 64×64 has an independent encoding QM with a size of 8×8, rather than reusing the same encoding QM with a 32×32 chroma QM. However, the same encoding QM is reused for chroma QMs with a reconstruction size of 64×64 and the same prediction mode (predMode), which helps reduce QM signaling overheads while ensuring consistence between encoding of a chroma QM and a luma QM.

In addition, this embodiment of this disclosure further provides the following example, which can also ensure consistence between encoding of a chroma QM and a luma QM.

For example, each chroma QM with a reconstruction size of 64×64 has an independent encoding QM. A size of the encoding QM may be 8×8. For example, Table 10 shows a correspondence between a QM id, matrixId, sizeId, and matrixRecSize according to another embodiment of this disclosure. The variable matrixId is a QM type id based on a prediction mode (predMode) and a color component (cIdx). The variable sizeId represents a size of a QM, and a definition standard of sizeId is shown in Table 8. The variable matrixRecSize represents a reconstruction size of the QM.

TABLE 10

| matrixId | | | sizeId | | | | | |
|---|---|---|---|---|---|---|---|---|
| | | | 2 | 4 | 8 | 8 | 8 | 8 |
| | | | | | | matrixRecSize | | |
| | | | 2 | 4 | 8 | 16 | 32 | 64 |
| 0 | predMode = | cIdx = 0 (Y) | | 2 | 8 | 14 | 20 | 26 |
| 1 | MODE_INTRA | cIdx = 1 (Cb) | | 3 | 9 | 15 | 21 | 27 |
| 2 | | cIdx = 2 (Cr) | | 4 | 10 | 16 | 22 | 28 |
| 3 | predMode = | cIdx = 0 (Y) | | 5 | 11 | 17 | 23 | 29 |
| 4 | MODE_INTER | cIdx = 1 (Cb) | 0 | 6 | 12 | 18 | 24 | 30 |
| 5 | (INTER, IBC) | cIdx = 2 (Cr) | 1 | 7 | 13 | 19 | 25 | 31 |

It can be seen from Table 10 that a value range of the QM id is a closed interval [0,31], and each chroma QM with a reconstruction size of 64×64 has an encoding QM with a size of 8×8. That is, a QM corresponding to chroma Cb with matrixId=1 and a reconstruction size of 64×64, a QM corresponding to chroma Cr with matrixId=2 and a reconstruction size of 64×64, a QM corresponding to chroma Cb with matrixId=4 and a reconstruction size of 64×64, a QM corresponding to chroma Cr with matrixId=5 and a reconstruction size of 64×64 each has an encoding QM with a size of 8×8, and ids of the encoding QMs are sequentially 27, 28, 30, and 31.

In an exemplary embodiment, an example in which the first parameter set is an APS is used. Syntax elements included in the APS and a syntax structure table may be shown in Table 11 below:

TABLE 11

| | Descriptor |
|---|---|
| scaling_list_data( ) { | |
|   scaling_matrix_for_lfnst_disabled_flag | u(1) |
|   for( id = 0; id < 31; id ++ ) { | |
|     matrixSize = (id < 2 ) ? 2 : ( ( id < 8 ) ? 4 : 8 ) | |
|     scaling_list_copy_mode_flag[ id ] | u(1) |
|     if( !scaling_list_copy_mode_flag[ id ] ) | |
|       scaling_list_pred_mode_flag[ id ] | u(1) |
|     if( ( scaling_list_copy_mode_flag[ id ] | | scaling_list_pred_mode_flag | |
|       [ id ] ) && id != 0 && id != 2 && id != 8) | |
|       scaling_list_pred_id_delta[ id ] | ue(v) |
|     if( !scaling_list_copy_mode_flag[ id ] ) { | |
|       nextCoef = 0 | |
|       if( id > 13 ) { | |
|         scaling_list_dc_coef[ id − 14 ] | se(v) |
|         nextCoef += scaling_list_dc_coef[ id − 14 ] | |
|       } | |
|       for( i = 0; i < matrix Size * matrixSize; i++ ) { | |
|         x = DiagScanOrder[ 3 ][ 3 ][ i ][ 0 ] | |
|         y = DiagScanOrder[ 3 ][ 3 ][ i ][ 1 ] | |
|         if( !( id > 25 && x >= 4 && y >= 4) ) { | |
|           scaling_list_delta_coef[ id ][ i ] | se(v) |
|           nextCoef += scaling list_delta_coef[ id ][ i ] | |
|         } | |
|         ScalingList[ id ][ i ] = nextCoef | |
|       } | |
|     } | |
|   } | |
| } | |

It can be seen from Table 11 that, if a value of the variable id is greater than 25 and both x and y are greater than 4, zero-out encoding is used in the 4×4 sub-matrix in the lower right corner. An element of ScalingMatrixRec[id][x][y] corresponding to the sub-matrix is set to 0.

In another example, a luma QM and a chroma QM of 64×64 may alternatively not be encoded in the APS. In this way, the same encoding QM with a size of 8×8 is reused for a luma QM and a chroma QM with a reconstruction size of 64×64 and the same type of luma QM and chroma QM with a reconstruction size of 32×32. For example, Table 12 shows a correspondence between a QM id, matrixId, sizeId, and matrixRecSize according to another embodiment of this disclosure. The variable matrixId is a QM type id based on a prediction mode (predMode) and a color component (cIdx). The variable sizeId represents a size of a QM, and a definition standard of sizeId is shown in Table 8. The variable matrixRecSize represents a reconstruction size of the QM.

TABLE 12

| matrixId | | | sizeId | | | | | |
|---|---|---|---|---|---|---|---|---|
| | | | 2 | 4 | 8 | 8 | 8 | 8 |
| | | | | | | matrixRecSize | | |
| | | | 2 | 4 | 8 | 16 | 32 | 64 |
| 0 | predMode = | cIdx = 0 (Y) | | 2 | 8 | 14 | 20 | 20 |
| 1 | MODE_INTRA | cIdx = 1 (Cb) | | 3 | 9 | 15 | 21 | 21 |
| 2 | | cIdx = 2 (Cr) | | 4 | 10 | 16 | 22 | 22 |
| 3 | predMode = | cIdx = 0 (Y) | | 5 | 11 | 17 | 23 | 23 |
| 4 | MODE_INTER | cIdx = 1 (Cb) | 0 | 6 | 12 | 18 | 24 | 24 |
| 5 | (INTER, IBC) | cIdx = 2 (Cr) | 1 | 7 | 13 | 19 | 25 | 25 |

It can be seen from Table 12 that a value range of the QM id is a closed interval [0, 25], and the same encoding QM with a size of 8×8 is reused for a luma QM and a chroma QM with a reconstruction size of 64×64 and a luma QM and a chroma QM with the same matrixId and a reconstruction size of 32×32. That is, the same encoding QM with a size of 8×8 is reused for a QM with matrixId of 0 to 5 and a reconstruction size of 64×64 and a QM with the same matrixId and a reconstruction size of 32×32. Ids of the encoding QMs are sequentially 20, 21, 22, 23, 24, and 25.

In an exemplary embodiment, an example in which the first parameter set is an APS is used. Syntax elements included in the APS and a syntax structure table may be shown in Table 13 below:

TABLE 13

|  | Descriptor |
|---|---|
| scaling_list_data( ) { | |
|   scaling_matrix_for_lfnst_disabled_flag | u(1) |
|   for( id = 0; id < 25; id ++ ) { | |
|     matrixSize = (id < 2 ) ? 2 : ( ( id < 8 ) ? 4 : 8 ) | |
|       scaling_list_copy_mode_flag[ id ] | u(1) |
|       if( !scaling_list_copy_mode_flag[ id ] ) | |
|         scaling_list_pred_mode_flag[ id ] | u(1) |
|       if( ( scaling_list_copy_mode_flag[ id ] \| \| scaling_list_pred_mode_flag[ id ] ) && | |
|         id != 0 && id != 2 && id != 8) | |
|         scaling_list_pred_id_delta[ id ] | ue(v) |
|       if( !scaling_list_copy_mode_flag[ id ] ) { | |
|         nextCoef = 0 | |
|         if( id > 13 ) { | |
|           scaling_list_dc_coef[ id - 14 ] | se(v) |
|           nextCoef += scaling_list_dc_coef[ id - 14 ] | |
|         } | |
|         for( i = 0; i < matrixSize * matrixSize; i++ ) { | |
|           x = DiagScanOrder[ 3 ][ 3 ][ i ][ 0 ] | |
|           y = DiagScanOrder[ 3 ][ 3 ][ i ][ 1 ] | |
|           ~~if( !( id > 25 && x >= 4 && y >= 4 ) ) {~~ | |
|             scaling_list_delta_coef[ id ][ i ] | se(v) |
|             nextCoef += scaling_list_delta_coef[ id ][ i ] | |
|           ~~}~~ | |
|           ScalingList[ id ][ i ] = nextCoef | |
|         } | |
|       } | |
|   } | |
| } | |

It can be seen from Table 13 that a syntax element if (!(id>25 && x>=4 && y>=4)) is deleted. A QM with a reconstruction size of 64×64 is exported from a QM ScalingMatrixRec[id][x][y] with an id the same as the QM with a reconstruction size of 64×64 and a reconstruction size of 32×32, which is specifically as follows.

In a first step, a QM (that is, m[x][y]) with a reconstruction size of 64×64 is calculated:

$$m[x][y] = \text{ScalingMatrixRec}[id][i][j] \text{ with } i=(x>>1), j=(y>>1) \quad \text{Formula 14}$$

In a second step, a DC coefficient m[0][0] of the QM with a reconstruction size of 64×64 is adjusted:

$$m[0][0] = \text{ScalingMatrixDCRec}[id-14] \quad \text{Formula 15}$$

The foregoing two examples both resolve the problem of inconsistency between encoding of a chroma QM and a luma QM, so that encoding of a chroma QM and a luma QM is more consistent.

Figure 12:
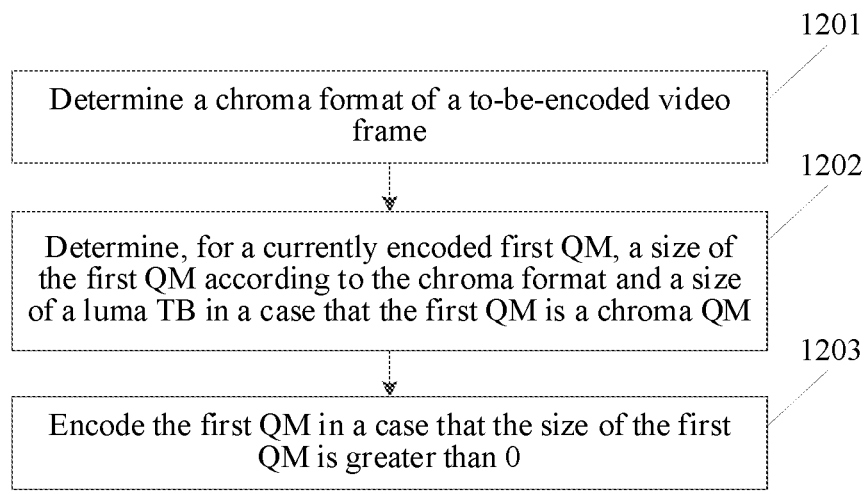
FIG. 12 is a flowchart of a video encoding method according to an embodiment of this disclosure.

FIG. 12 is a flowchart of a video encoding method according to an embodiment of this disclosure. In this embodiment, descriptions are made mainly by using an example in which the method is applied to the encoder side device introduced above. The method may include the following steps (1201 to 1203).

In Step 1201, a chroma format of a video frame is determined.

The video frame may be any video frame (or referred to as an image frame) to be encoded in a to-be-encoded video. The chroma format determines a sampling rate of a chroma component relative to a luma component. The chroma format can include, but is not limited to, at least one of the following: 4:0:0, 4:2:0, 4:2:2, 4:4:4. For a sampling rate corresponding to each chroma format, reference may be made to the foregoing descriptions of Table 4. Details are not described herein again.

In Step 1202, for a currently encoded first QM, a size of the first QM is determined according to the chroma format and a size of a luma TB, when the first QM is a chroma QM.

The video may be any QM. When encoding the first QM, the encoder side device may determine whether the first QM is a luma QM or a chroma QM according to an id of the first QM and with reference to a correspondence between an id of a predefined QM and a QM type id. For example, it is assumed that the correspondence between the id of the predefined QM and the QM type id is shown in Table 1. For example, if the id of the first QM is 2, the first QM is a luma QM, and if the id of the first QM is 4, the first QM is a chroma QM.

If the encoder-side device determines that the first QM is a chroma QM, the encoder side device determines a size of the first QM according to the chroma format and a size of a luma TB. For example, the chroma format is 4:2:0, and the size of the luma TB is 4×4, then the size of the first QM is 2×2. In another example, the chroma format is 4:4:4, and the size of the luma TB is 4×4, then the size of the first QM is 4×4. In still another example, the chroma format is 4:0:0, and the size of the luma TB is 4×4, then the size of the first QM is 0, that is, it indicates that there is no chroma component.

The encoder-side device can determine the size of the first QM according to the chroma format and a larger value of a width and a height of the luma TB. When the width of the luma TB is greater than the height of the luma TB, the larger value of the width and the height of the luma TB is the width of the luma TB; when the width of the luma TB is less than the height of the luma TB, the larger value of the width and the height of the luma TB is the height of the luma TB; and when the width of the luma TB is equal to the height of the luma TB, because the two are equal, the larger value of the width and the height of the luma TB may be either of the width or the height. For example, when the size of the luma TB is 8×4, assuming that the chroma format is 4:2:0, the size of the first QM is 4×4.

In Step 1203, the first QM is encoded when the size of the first QM is greater than 0.

The size of the first QM being equal to 0 indicates that there is no chroma component, and the size of the first QM being greater than 0 indicates that there is a chroma component. When the size of the first QM is greater than 0, the size of the first QM may be 2×2, 4×4, or 8×8, for example. Certainly, when the size of the first QM is greater than 0, the size thereof may alternatively be sizes other than those listed above. This is not limited in the embodiments of this disclosure.

When the size of the first QM is greater than 0, the encoder side device encodes the first QM, to generate a corresponding QM bitstream. In addition, when it is determined that the size of the first QM is equal to 0, the encoder side device may not encode the first QM. In one embodiment, when the chroma format is 4:2:0, and it is determined that the first QM is a chroma QM with a size of 2×2 according to the chroma format and the size of the luma TB, the encoder side device does not encode the first QM. For a QM that is not encoded, all elements of the QM are predefined by a default value. The default value can be 16. With reference to Formula 1, because scaling quantization coefficients of all transform coefficients in a TB are 1 in this case, an effect is the same as an effect of not using a QM.

The encoder-side device can encode the chroma format of the to-be-encoded video frame in the first parameter set, for example, add a first syntax element used for defining the chroma format to the first parameter set. The first parameter set is a parameter set including related syntax elements used for defining a QM. In one embodiment, the first parameter set is an APS, and the first syntax element may correspondingly be aps_chroma_format_idc.

Based on the above, in the technical solution provided in this embodiment of this disclosure, by determining a chroma format of a video frame; determining, when that a currently encoded QM is a chroma QM, a size of the currently encoded QM according to the chroma format and a size of a luma TB; and encoding the currently encoded QM when it is determined that the size of the currently encoded QM is greater than 0, a size of a chroma QM is flexibly determined according to a chroma format and a size of a luma TB, rather than a fixed size predefined according to an identifier (id) of the QM, thereby improving flexibility during encoding and decoding of the chroma QM. In addition, according to a size of a currently encoded QM, whether the QM needs to be encoded can be determined, so as to selectively encode QMs, thereby helping reduce codewords that QM signaling needs to occupy and reduce bit overheads.

In addition, an encoding process of the encoder side device corresponds to a decoding process of the decoder side device. For details of the encoding process that are not described in detail, reference may be made to the foregoing descriptions related to the decoding process embodiments, and details are not described herein again.

Apparatus embodiments of this disclosure are described below, which may be used for performing the method embodiments of this disclosure. For details not disclosed in the apparatus embodiments of this disclosure, reference may be made to the method embodiments of this disclosure.

Figure 13:
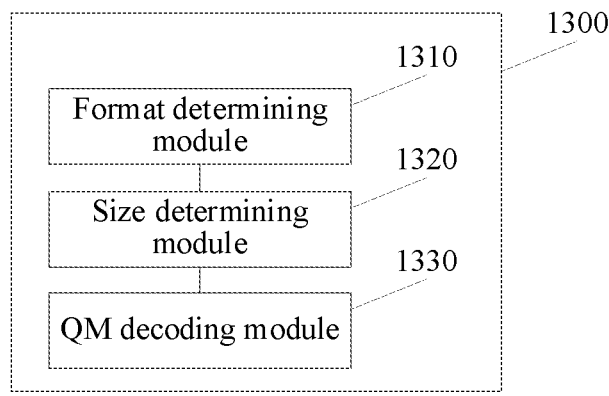
FIG. 13 is a block diagram of a video decoding apparatus according to an embodiment of this disclosure.

FIG. 13 is a block diagram of a video decoding apparatus according to an embodiment of this disclosure. The apparatus has a function of realizing the example of the foregoing video decoding method, and the function may be realized by hardware or by hardware executing corresponding software. The apparatus may be the decoder side device described above, or may be disposed on the decoder side device. The apparatus 1300 may include a format determining module 1310, a size determining module 1320, and a QM decoding module 1330. One or more of the modules of the apparatus can be implemented by processing circuitry, software, or a combination thereof, for example.

The format determining module 1310 is configured to determine a chroma format of a video frame.

The size determining module 1320 is configured to determine, for a currently decoded first QM, a size of the first QM according to the determined chroma format and a size of a luma TB in a case that the first QM is a chroma QM.

The QM decoding module 1330 is configured to decode the first QM when the determined size of the first QM is greater than zero.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In an exemplary embodiment, the QM decoding module 1330 is further configured to: (1) determine, when it is determined that the first QM is decoded in a copy mode or a prediction mode and a predefined first variable indicates existence of a reference QM corresponding to the first QM, the reference QM; and (2) determine the first QM according to the reference QM.

In an exemplary embodiment, the QM decoding module 1330 is further configured to determine the reference QM according to a syntax element scaling_list_pred_id_delta when a syntax element scaling_list_copy_mode_flag is equal to one or a syntax element scaling_list_pred_mode_flag is equal to one, and the first variable sizePresentFlag [log(matrixSize)−1] is equal to one, the syntax element scaling_list_copy_mode_flag being equal to one indicating that the first QM is decoded in the copy mode, the syntax element scaling_list_pred_mode_flag being equal to one indicating that the first QM is decoded in the prediction mode, and the first variable sizePresentFlag[log(matrixSize)−1] being equal to one indicating existence of the reference QM corresponding to the first QM.

In an exemplary embodiment, the format determining module 1310 is configured to further (1) obtain a first parameter set corresponding to the video frame, the first parameter set being a parameter set including related syntax elements used for defining a QM; and (2) determine the chroma format of the video frame according to a first syntax element included in the first parameter set.

In an exemplary embodiment, the first parameter set is an adaptive parameter set (APS), and the first syntax element is aps_chroma_format_idc.

In an exemplary embodiment, the size determining module 1320 is further configured to determine the size of the first QM according to the chroma format and a larger one of a width and a height of the luma TB.

In an exemplary embodiment, a luma QM and a chroma QM with a reconstruction size of 64×64 and the same type of luma QM and chroma QM with a reconstruction size of 32×32 have encoding QMs with a size of 8×8 independent of each other.

In an exemplary embodiment, the same encoding QM is reused for chroma QMs with a reconstruction size of 64×64 and the same prediction mode.

In an exemplary embodiment, the QM decoding module 1330 is further configured to decode the first QM by using a zero-out encoding scheme when the first QM corresponds to the luma QM or the chroma QM with a reconstruction size of 64×64.

In an exemplary embodiment, the QM decoding module 1330 is further configured to determine, when the first QM corresponds to the luma QM or the chroma QM with a reconstruction size of 64×64, that element values of a 4×8 region of a right half part of the first QM are zero when the first QM is the chroma QM and the chroma format is 4:2:2; otherwise, determine that element values of a 4×4 region of a lower right corner part of the first QM are zero.

In an exemplary embodiment, the same encoding QM with a size of 8×8 is reused for a luma QM and a chroma QM with a reconstruction size of 64×64 and the same type of luma QM and chroma QM with a reconstruction size of 32×32.

In an exemplary embodiment, the QM decoding module 1330 is further configured to determine all elements in the first QM as having a default value when the size of the first QM is equal to zero.

In an exemplary embodiment, the QM decoding module 1330 is further configured to determine all elements in the first QM as having a default value when the chroma format is 4:2:0 and the size of the first QM is 2×2.

In an exemplary embodiment, the default value is 16.

Based on the above, according to the technical solution provided in this embodiment of this application, by determining a chroma format of a video frame; determining, when a currently decoded QM is a chroma QM, a size of the currently decoded QM according to the chroma format and a size of a luma TB; and decoding the currently decoded QM when it is determined that the size of the currently decoded QM is greater than zero, a size of a chroma QM is flexibly determined according to a chroma format and a size of a luma TB, rather than a fixed size predefined according to an identifier (id) of the QM, thereby improving flexibility during encoding and decoding of the chroma QM. In addition, according to a size of a currently decoded QM, whether the QM needs to be decoded can be determined, so as to selectively decode QMs, thereby helping reduce computational complexity of a decoder side.

Figure 14:
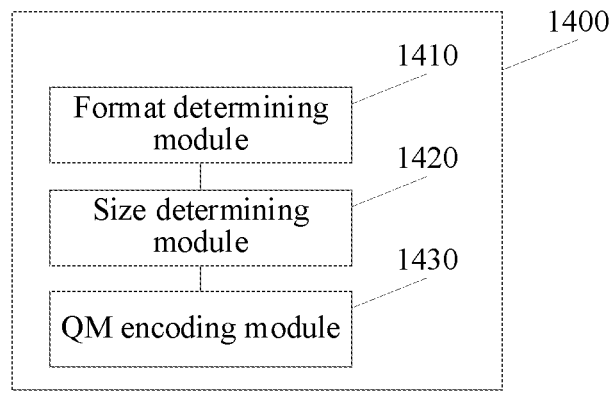
FIG. 14 is a block diagram of a video encoding apparatus according to an embodiment of this disclosure.

FIG. 14 is a block diagram of a video encoding apparatus according to an embodiment of this disclosure. The apparatus has a function of realizing the example of the foregoing video encoding method, and the function may be realized by hardware or by hardware executing corresponding software. The apparatus may be the encoder side device described above, or may be disposed on the encoder side device. The apparatus 1400 may include a format determining module 1410, a size determining module 1420, and a QM encoding module 1430.

The format determining module 1410 is configured to determine a chroma format of a video frame.

The size determining module 1420 is configured to determine, for a currently encoded first QM, a size of the first QM according to the determined chroma format and a size of a luma TB in a case that the first QM is a chroma QM.

The QM encoding module 1430 is configured to encode the first QM when the determined size of the first QM is greater than zero.

Based on the above, in the technical solution provided in this embodiment of this disclosure, by determining a chroma format of a to-be-encoded video frame; determining, when a currently encoded QM is a chroma QM, a size of the currently encoded QM according to the chroma format and a size of a luma TB; and encoding the currently encoded QM when it is determined that the size of the currently encoded QM is greater than 0, a size of a chroma QM is flexibly determined according to a chroma format and a size of a luma TB, rather than a fixed size predefined according to an identifier (id) of the QM, thereby improving flexibility during encoding and decoding of the chroma QM. In addition, according to a size of a currently encoded QM, whether the QM needs to be encoded can be determined, so as to selectively encode QMs, thereby helping reduce codewords that QM signaling needs to occupy and reduce bit overheads.

For details of the encoder side that are not described, reference may be made to the foregoing descriptions related to the decoder side embodiment, and details are not described herein again.

When the apparatus provided in the foregoing embodiments implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same concept. For the specific implementation process, reference may be made to the method embodiments, and details are not described herein again.

Figure 15:
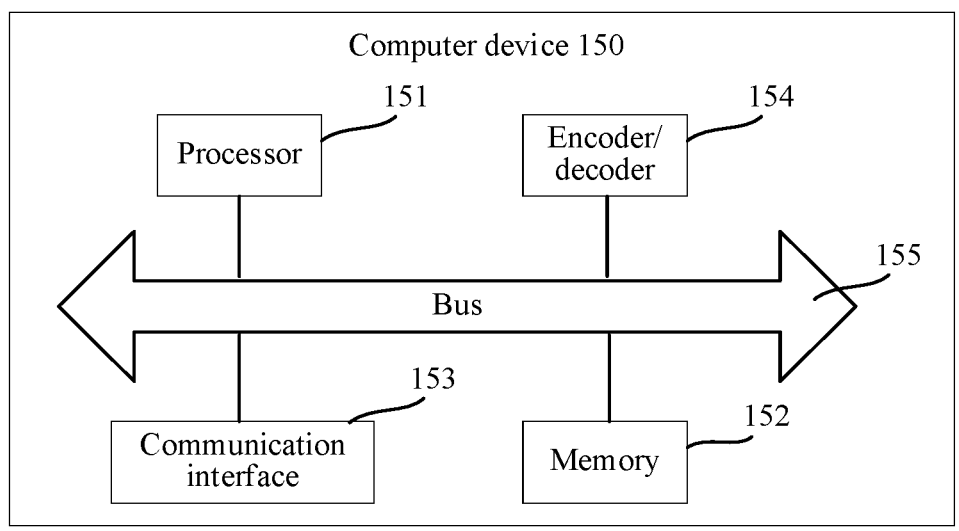
FIG. 15 is a structural block diagram of a computer device according to an embodiment of this disclosure.

FIG. 15 is a schematic block diagram of a computer device according to an embodiment of this disclosure. The computer device may be the encoder side device described above, or may be the decoder side device described above. The computer device 150 may include a processor 151, a memory 152, a communication interface 153, an encoder/decoder 154, and a bus 155.

The processor 151 (processing circuitry) includes one or more processing cores, and the processor 151 performs various functional applications and information processing by running a software program and module.

The memory 152 may be configured to store a computer program. The processor 151 is configured to execute the computer program, to implement the foregoing video encoding method, or implement the foregoing video decoding method.

The communication interface 153 may be configured to communicate with other devices, for example, receiving/transmitting audio and video data.

The encoder/decoder 154 may be configured to implement encoding and decoding functions, for example, encoding and decoding audio and video data.

The memory 152 is connected to the processor 151 through the bus 155.

In addition, the memory 152 may be implemented by any type of volatile or non-volatile storage device or a combination thereof. The volatile or non-volatile storage device includes, but not limited to: a magnetic disk, an optical disc, an electrically-erasable programmable read-only memory (EEPROM), an erasable programmable read-only memory (EPROM), a static random access memory (SRAM), a read only memory (ROM), a magnetic memory, a flash memory, or a programmable read-only memory (PROM).

A person skilled in the art may understand that the structure shown in FIG. 15 does not constitute any limitation on the computer device 150, and the computer device may include more components or fewer components than those shown in the figure, or some components may be combined, or a different component deployment may be used.

In an exemplary embodiment, a computer-readable storage medium is further provided, storing at least one instruction, at least one program, a code set, or an instruction set, the at least one instruction, the at least one program, the code set, or the instruction set, when executed by a processor, implementing the foregoing video decoding method, or implement the foregoing video encoding method.

In an exemplary embodiment, a computer program product is further provided, the computer program product, when executed by processing circuitry being configured to implement the foregoing video decoding method, or implement the foregoing video encoding method.

"Plurality of" mentioned in the specification means two or more. "And/or" describes an association relationship for associated objects and represents that three relationships may exist. For example, A and/or B may represent the following three cases: only A exists, both A and B exist, and only B exists. The character "/" generally indicates an "or" relationship between the associated objects.

The foregoing descriptions are merely exemplary embodiments of this disclosure, but are not intended to limit this disclosure. Any modification, equivalent replacement, or improvement made within the spirit and principle of this disclosure shall fall within the protection scope of this disclosure.

The invention claimed is:

1. A method for video decoding, comprising:
   determining a chroma format of a video frame;
   determining, for a first quantization matrix (QM) that is a chroma QM currently being decoded, a size of the first QM according to the determined chroma format and a larger one of a width and a height of a luma transform block (TB); and
   decoding the first QM when the determined size of the first QM is greater than zero.

2. The method according to claim 1, wherein the determining the chroma format of the video frame comprises:
   obtaining a first parameter set corresponding to the video frame, the first parameter set comprising related syntax elements for defining a QM; and
   determining the chroma format of the video frame according to a first syntax element in the first parameter set.

3. The method according to claim 2, wherein the first parameter set is an adaptive parameter set (APS), and the first syntax element is aps_chroma_format_idc.

4. The method according to claim 1, wherein the decoding further comprises:
   in response to a determination that the first QM is being decoded in a copy mode or a prediction mode and a predefined first variable indicates a reference QM corresponding to the first QM, determining the reference QM; and
   determining the first QM according to the reference QM.

5. The method according to claim 4, wherein the determining the reference QM comprises:
   determining the reference QM according to a syntax element scaling_list_pred_id_delta when a syntax element scaling_list_copy_mode_flag is equal to one or a syntax element scaling_list_pred_mode_flag is equal to one, and the predefined first variable sizePresentFlag[log(matrixSize)−1] is equal to one, and
   the syntax element scaling_list_copy_mode_flag being equal to one indicating that the first QM is being decoded in the copy mode, the syntax element scaling_list_pred_mode_flag being equal to one indicating that the first QM is being decoded in the prediction mode, and the predefined first variable sizePresentFlag[log(matrixSize)−1] being equal to one indicating the reference QM corresponding to the first QM.

6. The method according to claim 1, wherein a luma QM and a chroma QM with a reconstruction size of 64×64 and a same type of luma QM and chroma QM with a reconstruction size of 32×32 have encoding QMs with a size of 8×8 independent of each other.

7. The method according to claim 6, wherein a same encoding QM is reused for chroma QMs with the reconstruction size of 64×64 and a same prediction mode.

8. The method according to claim 6, wherein the decoding further comprises:
   decoding the first QM by using a decoding scheme corresponding to a zero-out encoding scheme when the first QM corresponds to the luma QM or the chroma QM with the reconstruction size of 64×64.

9. The method according to claim 8, wherein the decoding the first QM by using the zero-out encoding scheme further comprises:
   determining, when that the first QM corresponds to the luma QM or the chroma QM with the reconstruction size of 64×64, that element values of a 4×8 region of a right half part of the first QM are zero when the first QM is the chroma QM and the chroma format is 4:2:2; and
   otherwise, determining that element values of a 4×4 region of a lower right corner part of the first QM are 0.

10. The method according to claim 1, wherein a same encoding QM with a size of 8×8 is reused for a luma QM and a chroma QM with a reconstruction size of 64×64 and a same type of luma QM and chroma QM with a reconstruction size of 32×32.

11. The method according to claim 1, further comprising:
    after determining the size of the first QM, determining all elements in the first QM as having a default value when that the size of the first QM is equal to zero.

12. The method according to claim 1, further comprising:
    after determining the size of the first QM, determining all elements in the first QM as having a default value when the chroma format is 4:2:0 and the size of the first QM is 2×2.

13. The method according to claim 11, wherein the default value is 16.

14. A video encoding method, comprising:
    determining a chroma format of a video frame;
    determining, for a first quantization matrix (QM) that is a chroma QM currently being encoded, a size of the first QM according to the determined chroma format and a larger one of a width and a height of a luma transform block (TB); and
    encoding the first QM when the determined size of the first QM is greater than zero.

15. A video decoding apparatus, comprising:
    processing circuitry configured to
    determine a chroma format of a video frame;
    determine, for a first quantization matrix (QM) that is a chroma QM currently being decoded, a size of the first QM according to the determined chroma format and a larger one of a width and a height of a luma transform block (TB); and
    decode the first QM when the determined size of the first QM is greater than zero.

16. A computer device, comprising processing circuitry and a memory, the memory storing at least one instruction, at least one program, a code set, or an instruction set, the at least one instruction, the at least one program, the code set, or the instruction set being loaded and executed by the processing circuitry to implement the method according to claim 1.

17. A non-transitory computer-readable storage medium, storing at least one instruction, at least one program, a code set, or an instruction set, the at least one instruction, the at least one program, the code set, or the instruction set being loaded and executed by processing circuitry to implement the method according to claim 1.

18. The video decoding apparatus according to claim 15, wherein, in determining the chroma format of the video frame, the processing circuitry is further configured to:
  obtain a first parameter set corresponding to the video frame, the first parameter set comprising related syntax elements for defining a QM; and
  determine the chroma format of the video frame according to a first syntax element in the first parameter set.

19. The video decoding method according to claim 1, further comprising reconstructing the video frame based on the decoded first QM.

\* \* \* \* \*